US010687252B2

(12) United States Patent
Manolakos et al.

(10) Patent No.: US 10,687,252 B2
(45) Date of Patent: Jun. 16, 2020

(54) BANDWIDTH GROUP (BWG) FOR ENHANCED CHANNEL AND INTERFERENCE MITIGATION IN 5G NEW RADIO

(71) Applicant: QUALCOMM Incorporated, San Diego, CA (US)

(72) Inventors: Alexandros Manolakos, San Diego, CA (US); June Namgoong, San Diego, CA (US); Yang Yang, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 202 days.

(21) Appl. No.: 15/466,663

(22) Filed: Mar. 22, 2017

(65) Prior Publication Data

US 2018/0092002 A1 Mar. 29, 2018

Related U.S. Application Data

(60) Provisional application No. 62/401,059, filed on Sep. 28, 2016.

(51) Int. Cl.
*H04W 4/00* (2018.01)
*H04W 28/20* (2009.01)
(Continued)

(52) U.S. Cl.
CPC .......... *H04W 28/20* (2013.01); *H04L 5/0007* (2013.01); *H04L 5/0035* (2013.01); *H04W 72/04* (2013.01);
(Continued)

(58) Field of Classification Search
CPC .................................................. H04L 5/0007
See application file for complete search history.

(56) References Cited

U.S. PATENT DOCUMENTS 8,675,570 B2 *  3/2014  Cai ....................... H04L 5/0007
                                                              370/329
9,820,281 B1 * 11/2017  Werner ............. H04W 72/0453
(Continued)

OTHER PUBLICATIONS

International Search Report and Written Opinion—PCT/US2017/048053—ISA/EPO—dated Nov. 6, 2017.

*Primary Examiner* — Guang W Li
(74) *Attorney, Agent, or Firm* — Loza & Loza, LLP

(57) ABSTRACT

A method at a scheduling entity might include determining that interference is present from a neighboring scheduling entity, which implements a second subcarrier spacing that is different from a first subcarrier spacing of the scheduling entity. The scheduling entity might request the neighboring scheduling entity to negotiate a bandwidth group (BWG), where the BWG is a bandwidth occupied by downlink subcarriers within which a transmission parameter is maintained. The method might include negotiating a bandwidth of the bandwidth group and transmitting, if negotiating is successful, downlink data to a scheduled entity served by the scheduling entity according to the negotiated bandwidth. The transmission parameter might be a precoder, rank, modulation order, power inside each BWG, or numerology. The numerology might be scalable and might be a combination of subcarrier spacing and cyclic prefix (CP) overhead, The subcarrier spacing might be scaled while keeping constant the CP overhead as a percentage of a symbol duration.

30 Claims, 16 Drawing Sheets

(51) Int. Cl.
*H04W 72/04* (2009.01)
*H04L 5/00* (2006.01)
*H04W 72/08* (2009.01)
*H04W 72/12* (2009.01)

(52) U.S. Cl.
CPC ..... *H04W 72/042* (2013.01); *H04W 72/0446* (2013.01); *H04W 72/0453* (2013.01); *H04W 72/082* (2013.01); *H04W 72/12* (2013.01)

(56) References Cited

U.S. PATENT DOCUMENTS

| | | | | |
|---|---|---|---|---|
| 2007/0242600 A1* | 10/2007 | Li | .................. | H04L 5/0007 370/210 |
| 2010/0172341 A1* | 7/2010 | Park | .................. | H04L 5/0007 370/350 |
| 2011/0306350 A1 | 12/2011 | Barbieri et al. | | |
| 2012/0243453 A1* | 9/2012 | Hakola | ................ | H04L 5/003 370/311 |
| 2012/0243502 A1* | 9/2012 | Lindqvist | ............ | H04J 11/0046 370/330 |
| 2015/0180622 A1* | 6/2015 | Yoo | ................ | H04L 27/2602 370/330 |
| 2015/0256314 A1* | 9/2015 | Gauvreau | ............ | H04L 5/0053 370/329 |
| 2015/0333898 A1 | 11/2015 | Ji et al. | | |
| 2016/0219582 A1* | 7/2016 | Tiirola | ............... | H04L 27/2602 |
| 2016/0352551 A1* | 12/2016 | Zhang | ................ | H04L 27/2602 |
| 2017/0118748 A1* | 4/2017 | Kalhan | ................. | H04W 76/14 |
| 2017/0331577 A1* | 11/2017 | Parkvall | ............... | H04J 11/0079 |
| 2017/0332359 A1* | 11/2017 | Tsai | .................... | H04B 7/0617 |
| 2017/0332387 A1* | 11/2017 | Zhang | ................ | H04W 72/044 |
| 2017/0367003 A1* | 12/2017 | Zhang | .................... | H04W 8/08 |
| 2018/0048435 A1* | 2/2018 | Islam | ..................... | H04L 5/001 |
| 2018/0048511 A1* | 2/2018 | Hakola | ................. | H04L 5/0048 |
| 2018/0092084 A1* | 3/2018 | Yun | ..................... | H04L 5/0007 |
| 2018/0323830 A1* | 11/2018 | Park | ......................... | H04L 1/00 |
| 2018/0324603 A1* | 11/2018 | Hessler | ............... | H04B 17/309 |

\* cited by examiner

BANDWIDTH GROUP (BWG) FOR ENHANCED CHANNEL AND INTERFERENCE MITIGATION IN 5G NEW RADIO

PRIORITY CLAIM

This application claims priority to and the benefit of provisional patent application No. 62/401,059 filed in the United States Patent and Trademark Office on Sep. 28, 2016, the entire content of which is incorporated herein by reference as if fully set forth below in its entirety and for all applicable purposes.

TECHNICAL FIELD

The technology discussed below relates generally to wireless communication systems, and more particularly, to bandwidth groups useful in orthogonal frequency division multiplexed (OFDM) downlinks to wireless devices. Aspects can provide and enable techniques for establishment and use of bandwidth groups (BWG) for channel estimation and interference estimation in 5G New Radio (NR).

INTRODUCTION

It is envisaged that the next generation of wireless communication systems, referred to herein as fifth generation (5G) new radio or 5G NR, will use an orthogonal frequency division multiplexing (OFDM) waveform. 5G NR might be deployed with large bandwidths using OFDM as a transmission mode in either the downlink or uplink directions. As used herein, downlink refers to data flowing from a scheduling entity (e.g., base station, eNodeB (eNB), cell) to a scheduled entity (e.g., wireless communication device, terminal, user equipment (UE)), while uplink refers to data flowing in the opposite direction.

An OFDM waveform may be characterized with reference to its numerology. Broadly, a numerology refers to a set of parameters that characterize the OFDM waveform. In a present wireless communication system, such as Long Term Evolution (LTE), the numerology might be fixed. LTE numerology includes, for example, a radio frame duration (10 ms), subframe duration (1 ms), slot duration (0.5 ms), symbol duration (66.7 ms), subcarrier spacing (15 kHz), and resource blocks per subframe (12-100). In order to improve performance in the downlink it might be desirable to use numerologies, or aspects of numerologies, such as subcarrier spacing and symbol duration, that are scalable. That is, use numerologies that can change.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

According to some aspects, a method of wireless communication, operational at a scheduling entity, might include determining that interference is present from a neighboring scheduling entity that implements a second subcarrier spacing that is different from a first subcarrier spacing of the scheduling entity. The method might further include requesting the neighboring scheduling entity to negotiate a bandwidth group (BWG), wherein the BWG is a bandwidth occupied by downlink subcarriers within which a transmission parameter is maintained. The method might further include negotiating a bandwidth of the bandwidth group and transmitting, if negotiating is successful, downlink data to a scheduled entity served by the scheduling entity according to the negotiated bandwidth.

In some aspects, an apparatus for wireless communication might include a processor, a transceiver communicatively coupled to the processor, and a memory communicatively coupled to the processor. The processor might be configured to determine that interference is present from a neighboring scheduling entity that implements a second subcarrier spacing that is different from a first subcarrier spacing of a scheduling entity (e.g., the apparatus). The processor might be further configured to request the neighboring scheduling entity to negotiate a bandwidth group (BWG), wherein the BWG is a bandwidth occupied by downlink subcarriers within which a transmission parameter is maintained. The processor might be further configured to negotiate the bandwidth of the bandwidth group and transmit, if negotiating is successful, downlink data to a scheduled entity served by the scheduling entity according to the negotiated bandwidth.

According to some aspects, a method of wireless communication, operational at a scheduling entity (e.g., a base station) might include establishing a time-frequency grid, wherein the time-frequency grid defines a plurality of resource elements including a plurality of symbols and defining, in a frequency domain of the time-frequency grid, at least a first bandwidth group (BWG) established with a first numerology and a second BWG, established with a second numerology, where a BWG is a minimum bandwidth span for which at least one transmission parameter remains constant. The method might further include determining to frequency division multiplex a symbol in the plurality of symbols between the first numerology of the first BWG and the second numerology of the second BWG, wherein the first numerology is different from the second numerology. The method might further include defining a guard band in the frequency domain to reduce interference between adjacent resource blocks in the first BWG and the second BWG.

These and other aspects of the invention will become more fully understood upon a review of the detailed description, which follows. Other aspects and features of the present invention will become apparent to those of ordinary skill in the art, upon reviewing the following description of specific, exemplary aspects of the present invention in conjunction with the accompanying figures. While features of the present invention might be discussed relative to certain aspects and figures below, all aspects of the present invention can include one or more of the advantageous features discussed herein. In other words, while one or more aspects might be discussed as having certain advantageous features, one or more of such features might also be used in accordance with the various aspects of the invention discussed herein. In similar fashion, while exemplary aspects might be discussed below as device, system, or method

DETAILED DESCRIPTION

Figure 1:
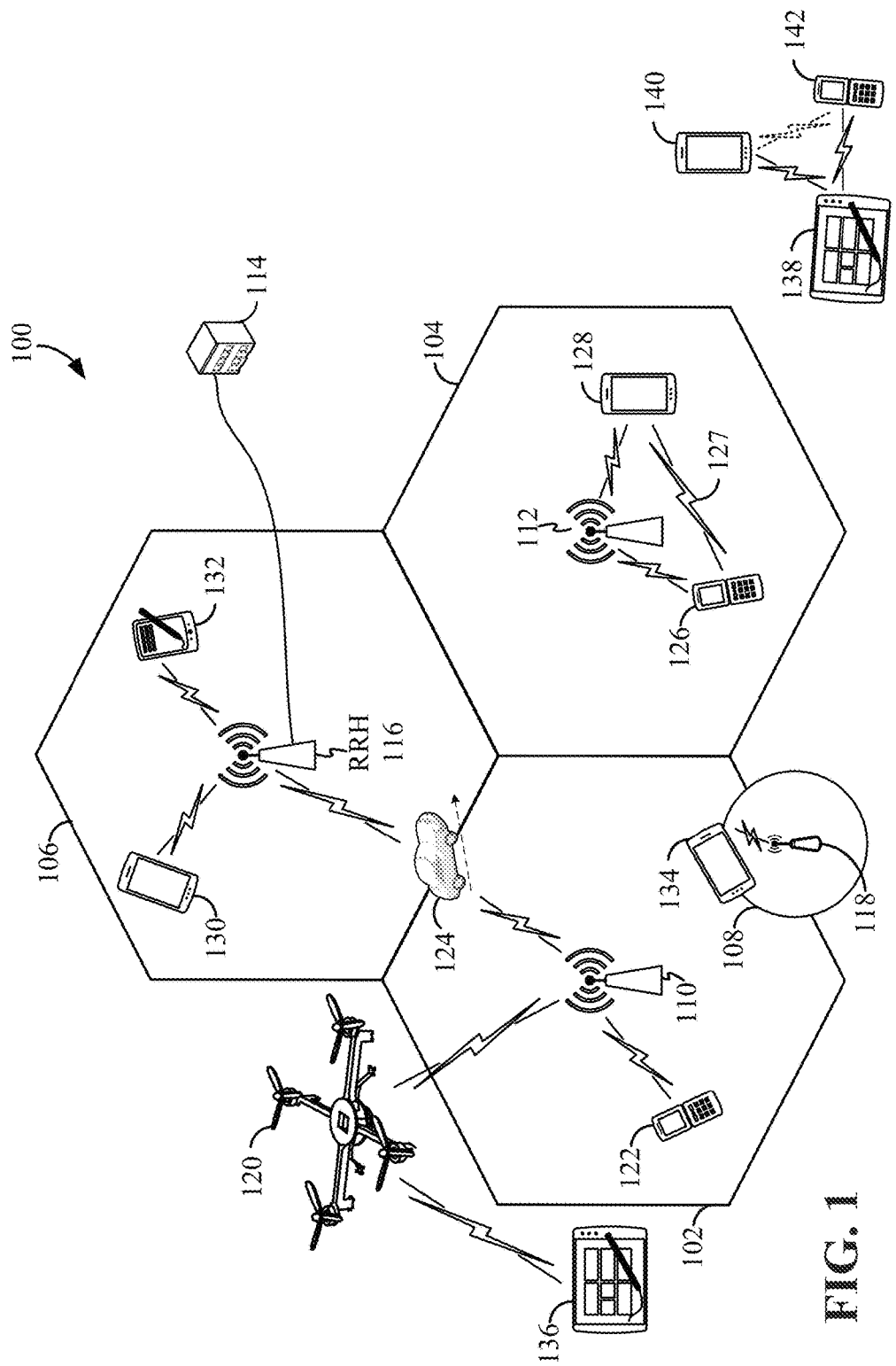
FIG. 1 is a conceptual diagram illustrating an example of an access network according to some aspects of the disclosure.

The detailed description set forth below in connection with the appended drawings is intended as a description of various configurations and is not intended to represent the only configurations in which the concepts described herein might be practiced. The detailed description includes specific details for the purpose of providing a thorough understanding of various concepts. However, it will be apparent to those skilled in the art that these concepts might be practiced without these specific details. In some instances, well known structures and components are shown in block diagram form in order to avoid obscuring such concepts.

As used herein, the term "new radio" (NR) generally refers to 5G technologies and the new radio access technology undergoing definition and standardization by 3GPP in Release 15.

As used herein, the term "beamforming" generally refers to directional signal transmission or reception. For a beamformed transmission, the amplitude and phase of each antenna in an array of antennas may be precoded, or controlled to create a desired (i.e., directional) pattern of constructive and destructive interference in the wavefront.

As used herein, the term "MIMO" is used as an abbreviation for multiple-input multiple-output. MIMO is a multi-antenna technology that exploits multipath signal propagation so that the information-carrying capacity of a wireless link can be multiplied by using multiple antennas at the transmitter and receiver to send multiple simultaneous streams. At the multi-antenna transmitter, a suitable precoding algorithm (scaling the respective streams' amplitude and phase) is applied (in some examples, based on known channel state information). At the multi-antenna receiver, the different spatial signatures of the respective streams (and, in some examples, known channel state information) can enable the separation of these streams from one another.

In single-user MIMO, the transmitter sends one or more streams to the same receiver, taking advantage of capacity gains associated with using multiple Tx, Rx antennas in rich scattering environments where channel variations can be tracked. The receiver may track these channel variations and provide corresponding feedback to the transmitter. This feedback may include channel quality information (CQI), the number of preferred data streams (e.g., rate control, a rank indicator (RI)), and a precoding matrix index (PMI).

As used herein, the term "OFDM" is used as an abbreviation for orthogonal frequency division multiplexing. An air interface may be defined according to a two-dimensional grid of resource elements, defined by separation of resources in frequency by defining a set of closely spaced frequency tones or subcarriers, and separation in time by defining a sequence of symbols having a given duration. By setting the subcarrier spacing between the tones based on the symbol rate, inter-symbol interference can be eliminated. OFDM channels provide for high data rates by allocating a data stream in a parallel manner across multiple subcarriers.

As used herein, the term "CP" is used as an abbreviation for cyclic prefix. A multipath environment degrades the orthogonality between subcarriers because symbols received from reflected or delayed paths may overlap into the following symbol. A CP addresses this problem by copying the tail of each symbol and pasting it onto the front of the OFDM symbol. In this way, any multipath components from a previous symbol fall within the effective guard time at the start of each symbol, and can be discarded.

The concept of "scalable numerology" is used herein in the sense that in OFDM, to maintain orthogonality of the subcarriers or tones, the subcarrier spacing is equal to the inverse of the symbol period. A scalable numerology refers to the capability of the network to select different subcarrier spacings, and accordingly, with each spacing, to select the corresponding symbol period. The symbol period should be short enough that the channel does not significantly vary over each period, in order to preserve orthogonality and limit inter-subcarrier interference.

The various concepts presented throughout this disclosure might be implemented across a broad variety of telecommunication systems, network architectures, and communication standards. Referring now to FIG. 1, as an illustrative example without limitation, a simplified schematic illustration of a radio access network 100 is provided.

FIG. 1 is a conceptual diagram illustrating an example of radio access network 100 according to some aspects of the disclosure. The geographic region covered by the radio access network 100 might be divided into a number of cellular regions (cells), including macrocells 102, 104, and 106, and a small cell 108, each of which might include one or more sectors. Cells might be defined geographically (e.g., by coverage area) and/or might be defined in accordance with a frequency, scrambling code, etc. In a cell that is divided into sectors, the multiple sectors within a cell can be formed by groups of antennas with each antenna responsible for communication with mobile devices in a portion of the cell, or with the phase of the signal being adjusted to a group of antennas so as to form one or more beams for communication with mobile devices in a portion of the cell (as in a multiple-input-multiple-output (MIMO) system).

In general, a radio transceiver apparatus serves each cell. A radio transceiver apparatus is commonly referred to as a base station (BS) in many wireless communication systems, but might also be referred to by those skilled in the art as a base transceiver station (BTS), a radio base station, a radio transceiver, a transceiver function, a basic service set (BSS), an extended service set (ESS), an access point (AP), a Node B, an eNodeB (eNB), a gNodeB (gNB), or some other suitable terminology. A radio transceiver apparatus might be referred to as a scheduling entity herein.

In FIG. 1, two high-power base stations 110 and 112 (e.g., scheduling entities) are shown in cells 102 and 104; and a third high-power base station 114 (e.g., scheduling entity) is shown controlling a remote radio head (RRH) 116 in cell 106. In this example, the cells 102, 104, and 106 might be referred to as macrocells, as the high-power base stations 110, 112, and 114 support cells having a large size. Further, a low-power base station 118 (e.g., scheduling entity) is shown in the small cell 108 (e.g., a microcell, picocell, femtocell, home base station, home Node B, home eNB, etc.) which might overlap with one or more macrocells. In this example, the cell 108 might be referred to as a small cell, as the low-power base station 118 supports a cell having a relatively small size. Cell sizing can be done according to system design as well as component constraints. It is to be understood that the radio access network 100 might include any number of wireless base stations (e.g., scheduling entities) and cells. The base stations 110, 112, 114, 118 (e.g., scheduling entities) provide wireless access points to a core network for any number of mobile apparatuses.

FIG. 1 further includes a quadcopter or drone 120, which might be configured to function as a base station (e.g., scheduling entity). That is, in some examples, a cell might not necessarily be stationary, and the geographic area of the cell might move according to the location of a mobile base station such as the quadcopter or drone 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network 100. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

Any combination of base stations in geographic proximity to one another might be referred to as neighboring base stations (e.g., neighboring scheduling entities). The geographic proximity might be a direct proximity (as in base stations in adjoining cells) and might also include indirect proximity (as in base stations of cells that have an intervening cell positioned between their own cells). Proximity, for describing neighboring scheduling entities, might by way of non-limiting example, be described in terms of whether a serving transmission to a first UE (e.g., a first scheduled entity) from a first scheduling entity is perceived as interference to a second UE (e.g., a second scheduled entity) served by the presumed neighboring scheduling entity.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but might also be referred to by those skilled in the art as a scheduled entity, a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A mobile apparatus might be referred to as a scheduled entity herein.

Within the present document, a "mobile" apparatus need not necessarily have a capability to move, and might be stationary. Some non-limiting examples of a mobile apparatus include a mobile device, a cellular (cell) phone, a smart phone, a session initiation protocol (SIP) phone, a laptop, a personal computer (PC), a notebook, a netbook, a smartbook, a tablet, and a personal digital assistant (PDA). A mobile apparatus might additionally be an "Internet of things" (IoT) device such as an automotive or other transportation vehicle, a satellite radio, a global positioning system (GPS) device, a logistics controller, a drone, a multi-copter, a quad-copter, a consumer and/or wearable device, such as eyewear, a wearable camera, a smart watch, a health or fitness tracker, a digital audio player (e.g., MP3 player), a camera, a game console, etc. An IoT device might additionally be a digital home or smart home device such as a home audio, video, and/or multimedia device, an appliance, a sensor, a vending machine, intelligent lighting, a home security system, a smart meter, etc. A mobile apparatus might additionally be a smart energy or security device, a solar panel or solar array, municipal lighting, water, or other infrastructure; industrial automation and enterprise device, etc. Still further, a mobile apparatus might provide for telemedicine support, or health care at a distance. Telehealth devices might include telehealth monitoring devices and telehealth administration devices, whose communication might be given preferential treatment or prioritized access over other types of information, e.g., in terms of prioritized access for transport of critical service data, and/or relevant QoS for transport of critical service data.

Within the radio access network 100, the cells might include UEs (e.g., scheduled entities) that might be in communication with one or more sectors of each cell. For example, UEs 122 and 124 might be in communication with base station 110; UEs 126 and 128 might be in communication with base station 112; UEs 130 and 132 might be in communication with base station 114 by way of RRH 116; UE 134 might be in communication with low-power base station 118; and UE 136 might be in communication with mobile base station such as the quadcopter or drone 120. Here, each base station 110, 112, 114, 118, and 120 might be configured to provide an access point to a core network (not shown) for all the UEs in the respective cells.

In another example, a mobile network node (e.g., quadcopter or drone 120) might be configured to function as a UE. For example, the quadcopter or drone 120 might operate within cell 102 by communicating with base station 110. In some aspects of the disclosure, two or more UE (e.g., UEs 126 and 128) might communicate with each other using peer to peer (P2P) or sidelink signals 127 without relaying that communication through a base station (e.g., base station 112).

Unicast or broadcast transmissions of control information and/or data from a base station (e.g., base station 110) to one or more UEs (e.g., UEs 122 and 124) might be referred to as downlink (DL) transmission, while transmissions of control information and/or data originating at a UE (e.g., UE 122) might be referred to as uplink (UL) transmissions. In addition, the uplink and/or downlink control information and/or traffic information may be time-divided into frames, subframes, slots, mini-slots, and/or symbols. As used herein, a symbol may refer to a unit of time that, in an OFDM waveform, carries one resource element (RE) per subcarrier. A slot may carry 7 or 14 OFDM symbols. A subframe may refer to a duration of 1 ms. Multiple subframes may be grouped together to form a single frame or radio frame. Of course, these definitions are not required, and any suitable scheme for organizing waveforms may be utilized, and various time divisions of the waveform may have any suitable duration. A mini-slot may be as short as one OFDM symbol.

The air interface in the radio access network 100 might utilize one or more multiplexing and multiple access algorithms to enable simultaneous communication of the various devices. For example, multiple access for uplink (UL) or reverse link transmissions from UEs 122 and 124 to base station 110 might be provided utilizing time division multiple access (TDMA), code division multiple access (CDMA), frequency division multiple access (FDMA), orthogonal frequency division multiple access (OFDMA), sparse code multiple access (SCMA), or other suitable multiple access schemes. Further, multiplexing downlink (DL) or forward link transmissions from the base station 110 to UEs 122 and 124 might be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the radio access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the radio access network 100, the ability for a UE to communicate while moving, independent of its location, is referred to as mobility. The various physical channels between the UE and the radio access network are generally set up, maintained, and released under the control of a mobility management entity (MME). In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals might be utilized by the network to select a serving cell for a UE. In some examples, the base stations 110, 112, and 114/116 might broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 might receive the unified synchronization signals, derive the carrier frequency and subframe timing from the synchronization signals, and in response to deriving timing, transmit an uplink pilot or reference signal. The uplink pilot signal transmitted by a UE (e.g., UE 124) might be concurrently received by two or more cells (e.g., base stations 110 and 114/116) within the radio access network 100. Each of the cells might measure a strength of the pilot signal, and the access network (e.g., one or more of the base stations 110 and 114/116 and/or a central node within the core network) might determine a serving cell for the UE 124. As the UE 124 moves through the radio access network 100, the network might continue to monitor the uplink pilot signal transmitted by the UE 124. When the signal strength or quality of the pilot signal measured by a neighboring cell exceeds that of the signal strength or quality measured by the serving cell, the radio access network 100 might handover the UE 124 from the serving cell to the neighboring cell, with or without informing the UE 124.

Although the synchronization signal transmitted by the base stations 110, 112, and 114/116 might be unified, the synchronization signal might not identify a particular cell, but rather might identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network might be reduced.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface might be scheduled, wherein a scheduling entity (e.g., a base station) allocates resources for communication among some or all devices and equipment within its service area or cell. Within the present disclosure, as discussed further below, the scheduling entity might be responsible for scheduling, assigning, reconfiguring, and releasing resources for one or more scheduled entities. That is, for scheduled communication, UEs or scheduled entities utilize resources allocated by the scheduling entity.

Base stations are not the only entities that might function as a scheduling entity. That is, in some examples, a UE might function as a scheduling entity, scheduling resources for one or more scheduled entities (e.g., one or more other UEs). In other examples, sidelink signals might be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 might function as a scheduled entity or a non-primary (e.g., secondary) sidelink device. In still another example, a UE might function as a scheduling entity in a device-to-device (D2D), peer-to-peer (P2P), or vehicle-to-vehicle (V2V) network, and/or in a mesh network. In a mesh network example, UEs 140 and 142 might optionally communicate directly with one another in addition to communicating with the scheduling entity (e.g., UE 138).

Figure 2:
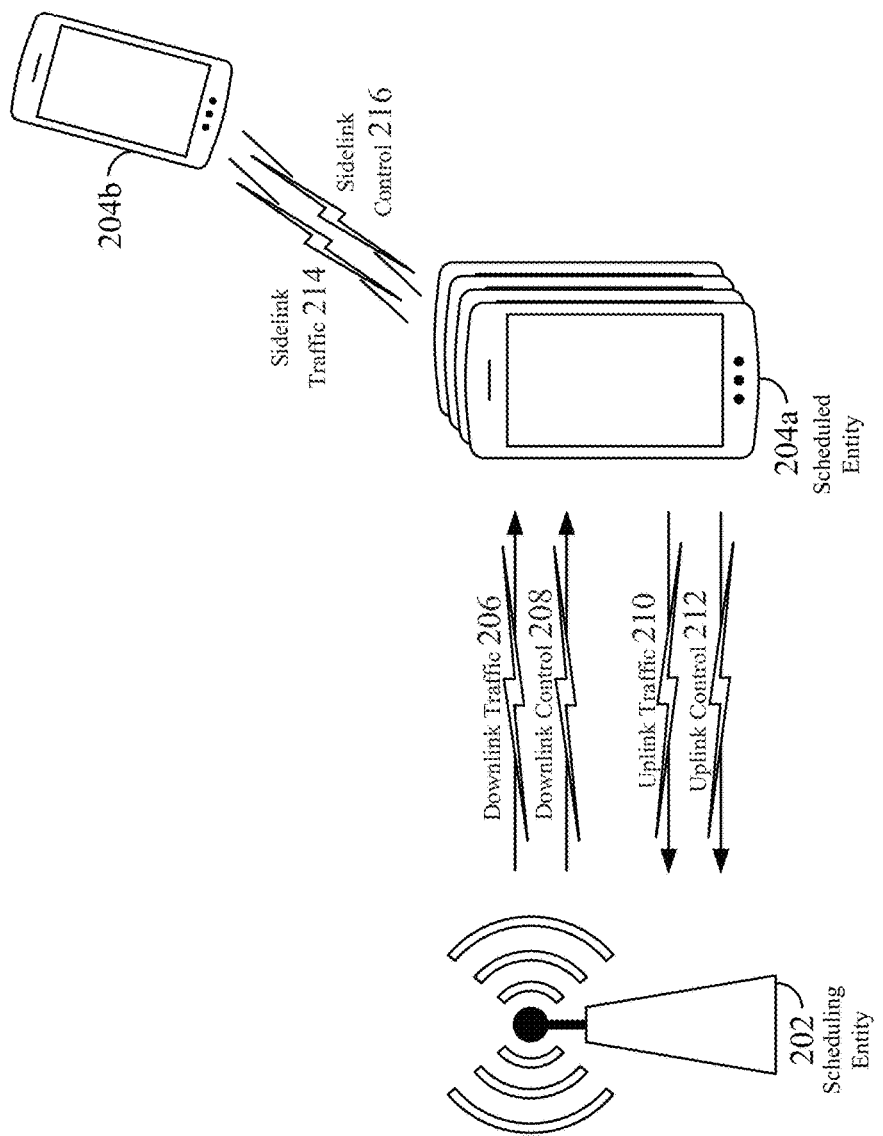
FIG. 2 is a block diagram conceptually illustrating an example of a scheduling entity communicating with a plurality of scheduled entities according to some aspects of the disclosure.

Thus, in a wireless communication network with a scheduled access to time-frequency resources and having a cellular configuration, a P2P configuration, or a mesh configuration, a scheduling entity and one or more scheduled entities might communicate utilizing the scheduled resources. Referring now to FIG. 2, a block diagram conceptually illustrating an example of a scheduling entity 202 communicating with a plurality of scheduled entities 204 (e.g., 204a and 204b) according to some aspects of the disclosure. Here, the scheduling entity 202 might correspond to the base stations 110, 112, 114, and 118. In additional examples, the scheduling entity 202 might correspond to the UE 138, the quadcopter or drone 120, or any other suitable node in the radio access network 100. Similarly, in various examples, the scheduled entity 204 might correspond to the UE 122, 124, 126, 128, 130, 132, 134, 136, 138, 140, and 142, or any other suitable node in the radio access network 100.

As illustrated in FIG. 2, the scheduling entity 202 may broadcast traffic to one or more scheduled entities 204 (the traffic may be referred to as downlink traffic 206). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink traffic 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 might broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well-known to those of ordinary skill in the art, wherein packet transmissions might be checked at the receiving side for accuracy, and if confirmed, an ACK might be transmitted, whereas if not confirmed, a NACK might be transmitted. In response to a NACK, the transmitting device might send a HARQ retransmission, which might implement chase combining, incremental redundancy, etc.

Uplink traffic 210 and/or downlink traffic 206 including one or more traffic channels, such as a physical downlink shared channel (PDSCH) or a physical uplink shared channel (PUSCH) (and, in some examples, system information blocks (SIBs)), might be additionally transmitted between the scheduling entity 202 and the scheduled entity 204. Transmissions of the control and data information might be organized by subdividing a carrier, in time, into suitable transmission time intervals (TTIs).

Furthermore, the scheduled entities 204 might transmit uplink control information 212 including one or more uplink control channels to the scheduling entity 202. Uplink control information 212 might include a variety of packet types and categories, including pilots, reference signals, and information configured to enable or assist in decoding uplink traffic transmissions. In some examples, the uplink control information 212 might include a scheduling request (SR), i.e., request for the scheduling entity 202 to schedule uplink transmissions. Here, in response to the SR transmitted on the control channel, the scheduling entity 202 might transmit control information 208 that might schedule the TTI for uplink packet transmissions.

Uplink and downlink transmissions may generally utilize a suitable error correcting block code. In a typical block code, an information message or sequence is split up into blocks, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, and polar codes. Various implementations of scheduling entities 202 and scheduled entities 204 may include suitable hardware and capabilities (e.g., an encoder and/or decoder) to utilize any one or more of these error correcting codes for wireless communication.

In some examples, scheduled entities such as a first scheduled entity 204*a* and a second scheduled entity 204*b* may utilize sidelink signals for direct D2D communication. Sidelink signals may include sidelink traffic 214 and sidelink control 216. Sidelink control 216 information may include a request-to-send (RTS) channel and a clear-to-send (CTS) channel. The RTS may provide for a scheduled entity 204 to request a duration of time to keep a sidelink channel available for a sidelink signal; and the CTS may provide for the scheduled entity 204 to indicate the availability of the sidelink channel, e.g., for a requested duration of time. An exchange of RTS and CTS signals (e.g., handshake) may enable different scheduled entities performing sidelink communications to negotiate the availability of the sidelink channel prior to communication of the sidelink traffic 214 information.

The channels or carriers illustrated in FIG. 2 are not necessarily all of the channels or carriers that might be utilized between a scheduling entity 202 and scheduled entities 204, and those of ordinary skill in the art will recognize that other channels or carriers might be utilized in addition to those illustrated, such as other data, control, and feedback channels.

Figure 3:
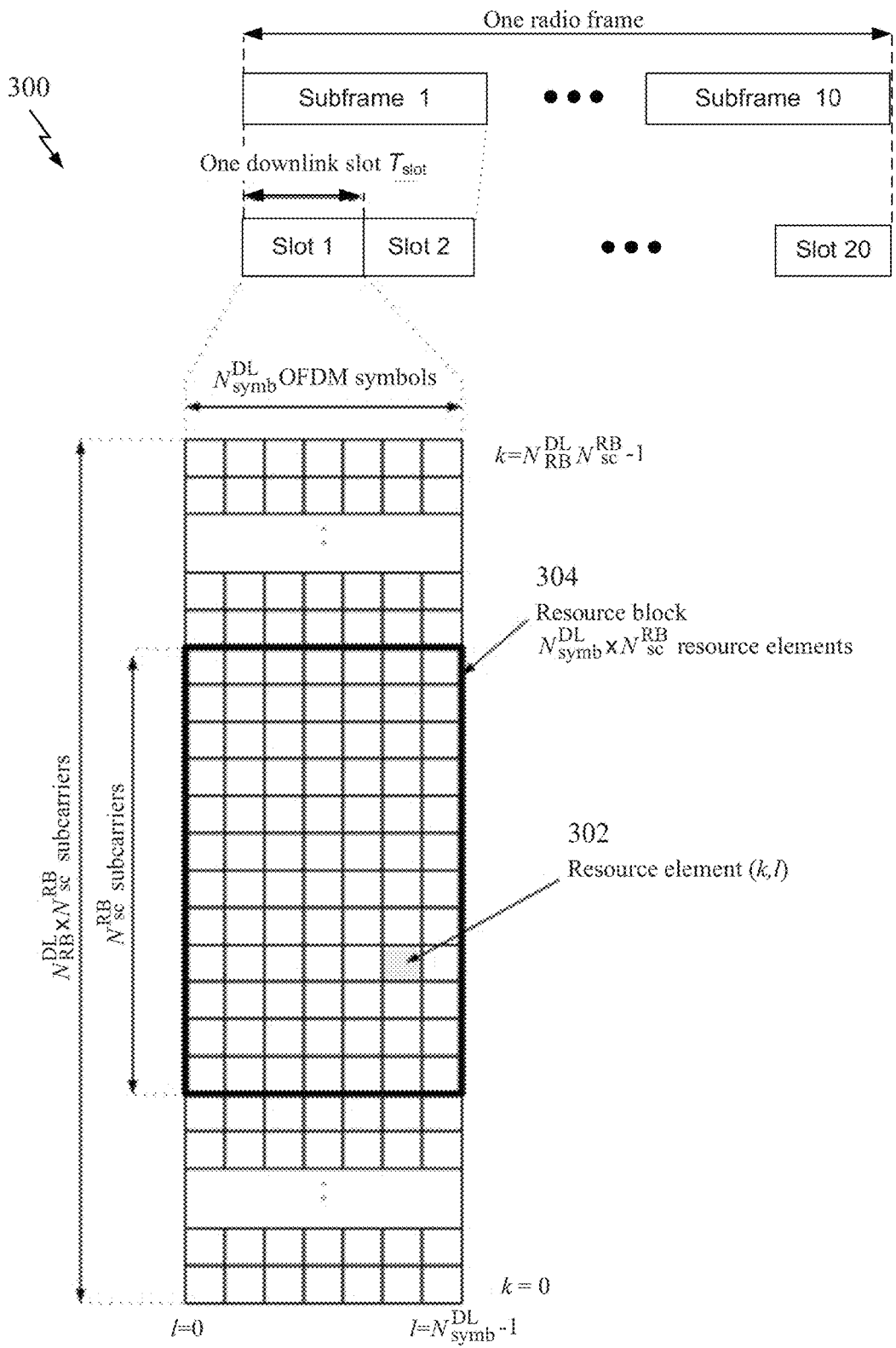
FIG. 3 is a downlink time-frequency grid for a fifth generation (5G) New Radio (NR) wireless communication scheme in accordance with some aspects of the disclosure.

FIG. 3 is a downlink time-frequency grid 300 for a fifth generation (5G) New Radio (NR) wireless communication scheme in accordance with some aspects of the disclosure. In FIG. 3, the horizontal axis represents the time domain and the vertical axis represents the frequency domain. Each box is known as a resource element 302. A resource element 302 represents one symbol and one subcarrier. Accordingly, the time-frequency grid 300 is divided into a plurality of resource elements 302. The resource element 302 is the smallest discrete part of the time-frequency grid 300. The resource element 302 includes a single complex value representing data from a physical channel or signal. The data might be modulated using various modulation schemes, such as, for example, QPSK, 16-QAM, 64-QAM, or 256-QAM. Other modulation schemes are acceptable.

A plurality of resource elements forms a resource block (RB), also referred to herein, and also known as, a physical resource block (PRB). In 5G NR, as in LTE, the allocation of PRBs is handled by a scheduling function at a scheduling entity (e.g., a base station, an eNB, a gNB, a network access node, a cell). Each user is allocated a number resource blocks in the time-frequency grid.

By way of example, in LTE, a radio frame might be 10 ms in duration (in the time domain) and might include ten subframes. An LTE subframe might be 1 ms in duration and might include two slots. An LTE slot might be 0.5 ms in duration and each 0.5 ms assignment can include N resource blocks (e.g., one resource block, or physical resource block 304) is illustrate in bold outline in FIG. 3). In LTE, N might be between 6 and 100 depending on bandwidth allocation and resource availability. In LTE, one resource block (RB) might be 1 ms in duration in the time domain and might contain 12 subcarriers for each OFDM symbol in the frequency domain (as shown in FIG. 3). In LTE the subcarrier spacing is fixed at a span of 15 kHz between subcarriers. In 5G NR, however, with a scalable numerology, the duration of a resource block in the time domain and the span of the resource block in the frequency domain might be changed from that of LTE. In 5G NR, for example, the span of the resource block might be scalable, as explained later herein.

Returning to the example of LTE, one physical resource block might be 1 msec in duration in the time domain and might contain 12 subcarriers for each OFDM symbol in the frequency domain. In 5G NR, however, a physical resource block might contain a different number of subcarriers of each OFDM symbol in the frequency domain. In other words, in 5G NR one physical resource block might have 12 subcarriers, or might have 6 subcarriers, or 16 subcarriers. Other numbers of subcarriers in a 5G NR resource block are acceptable. The span in the frequency domain of each physical resource block might also change. The number of subcarriers in a physical resource block and the span of each physical resource block in Hz relates to numerology. In LTE the numerology is fixed, (e.g., in LTE, the span of each physical resource block was 12 subcarriers, each one of 15 KHz, that is 180 KHz) however, in 5G NR the numerology might be scalable. The concept of scalable numerology as might be used, for example, in 5G NR, will be discussed later herein.

Returning to the example of LTE, there might be 7 OFDM symbols (normal cyclic prefix) per slot in the time domain (as shown in FIG. 3) or 6 OFDM symbols (long cyclic prefix) per slot. The number of OFDM symbols per slot in the time domain in 5G NR might be different from that in LTE.

Figure 4:
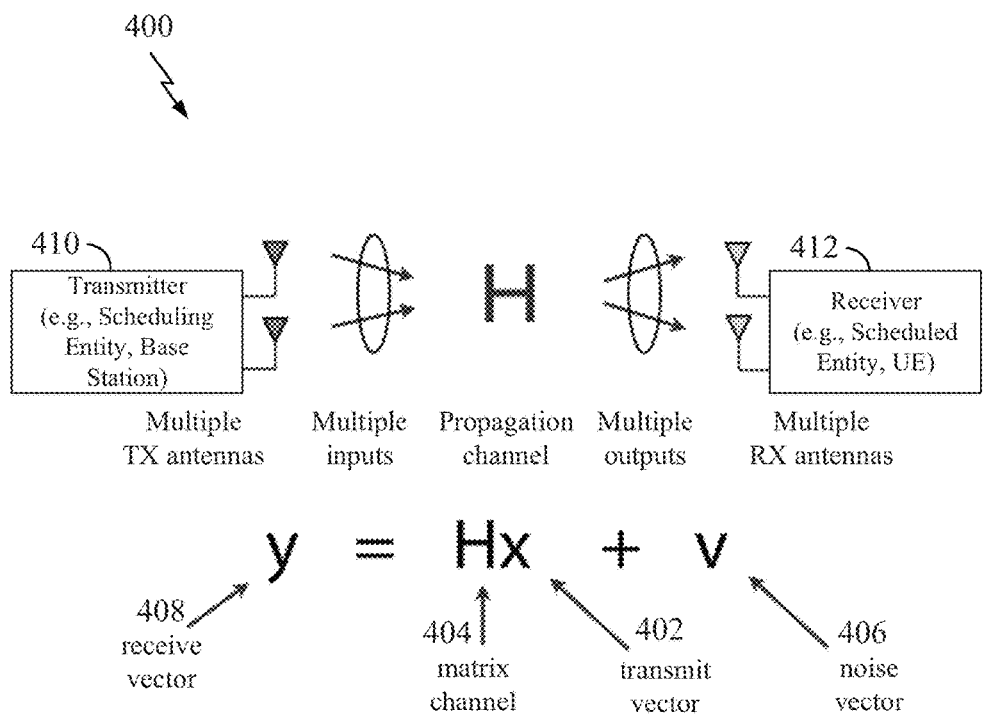
FIG. 4 is a theoretical model showing the path of a transmit vector "x" passing through a propagation channel represented by matrix "H" 404 with added noise represented by noise vector "v" 406 in accordance with some aspects of the disclosure.

FIG. 4 is a theoretical model 400 showing the path of a transmit vector "x" 402 in any resource element passing through a propagation channel represented by matrix "H" 404 with added noise represented by noise vector "v" 406 in accordance with some aspects of the disclosure. The received signal is represented by receive vector "y" 408. Theoretically, every resource element 302 represents a transmission of one or more symbols (more than one if it is a MIMO system) (e.g., a quadrature amplitude modulated (QAM) symbol). The transmitted symbol might be represented by the transmit vector "x" 402, which is a vector containing complex numbers. The transmitted symbol passes through the propagation channel represented by channel matrix "H" 404. The transmit vector "x" 402 is distorted by propagation through the channel due to many factors that are well known to those of skill in the art. Noise, represented by noise vector "v" 406, is added to the signal. The resultant signal that is received at the receiver 412 is referred to as receive vector "y" 408. Receive vector "y" 408 is also a vector that contains complex numbers that represent the received signal at this specific resource element. The transmitter 410 transmits each symbol to the receiver 412. Each of the transmitter 410 and receiver 412 might include multiple antennas to facilitate multiple-input multiple-output (MIMO) transmission and/or reception.

Returning to FIG. 3, a group of resource elements might be referred to as a physical resource block (PRB) 304. A PRB 304 might be the smallest unit of resources (e.g., resource elements 302) that can be allocated to a user. As illustrated, a PRB 304 includes a set of N resource block subcarriers (e.g., $NR_{sc}^{RB}$) over N downlink symbols (e.g., $N_{symb}^{DL}$). Accordingly, a UE (e.g., a scheduled entity) might receive a group of resources that is the size of a PRB, but not smaller than the size of the PRB.

A precoding resource block group (PRG) might be a set of consecutive resource blocks in which a UE might assume that the same precoder is applied on all scheduled PRBs within a PRG. The size of the PRG might depend on the system bandwidth. For example, in an LTE system, the size of the PRG might depend on the system bandwidth. Precoding might be used when signals are transmitted using MIMO.

Returning to FIG. 4, the precoder might be a matrix value (not shown) that is applied between H 404 and x 402. Accordingly, when a precoder is used, the precoder matrix (not shown) is being multiplied between H 404 and x 402. The PRG is important because in the PRG the UE knows that precoding within each PRB in the PRG is the same and the UE can perform channel estimation across all resource elements 302 within a PRB 304 concurrently. As known to those skilled in the art, in LTE, the UE knows the system bandwidth by, for example, reading it in a system information block (SIB) and knows, for example that if PRG is equal to three, that the precoder is the same for three PRBs. The UE determines the kind of channel estimation that it uses, therefore the UE can know that for every three PRBs it can use the same channel estimation.

In 5G NR there might be a notion of "scaled numerology" or "scalable numerology" or "family of scaled numerologies". As used herein, numerology might be a reference to a combination of subcarrier spacing and cyclic prefix (CP) overhead (e.g. CP length). Numerology might also include other parameters such as, for example, fast Fourier transform (FFT) size and the number of symbols per subframe. Other parameters are within the scope of numerology as referred to herein. Accordingly, numerology might be a combination of subcarrier spacing, symbol duration, cyclic prefix (CP) overhead, and additional parameters used in UL and/or DL communications in a 5G NR system.

In scaled numerology, the subcarrier spacing might be scaled while keeping constant the CP overhead as a percentage of the symbol duration (or symbol length). For example, there might be a nominal numerology having a subcarrier spacing of, for example, 15 kHz with a CP overhead of about 7 percent.

For 5G NR, various transmission numerologies might be supported. That is, transmission numerologies that have heretofore had fixed values (such as subcarrier spacing) might have variable values. The various transmission numerologies might be frequency division multiplexed (FDMed) or time division multiplexed (TDMed). In some aspects, some portion of the allocated bandwidth (e.g., allocated in one or more PRBs) could be transmitted using one numerology and some other portion of the allocated bandwidth could be transmitted using another numerology. Similarly, some OFDM symbols could be transmitted using one numerology and some other OFDM symbols could be transmitted using another numerology.

A scaled numerology family (where the family includes the numerology related to subcarrier spacing) might imply that there is a fixed basic or nominal subcarrier spacing (e.g., f0), such as 15 kHz, and then this nominal subcarrier spacing might be scaled by an integer number by keeping the same CP overhead. When the subcarrier spacing is multiplied by an integer value, the symbol duration is divided by the same integer value. Accordingly, if the subcarrier spacing is multiplied by 2, then the symbol duration becomes half of its original value, while the CP overhead remains constant as a percentage of the symbol duration (or symbol length) (e.g., always remains at 7 percent).

Accordingly, a scaled numerology based on a 15 kHz nominal subcarrier spacing (f0=15 kHz) could include a subcarrier spacing of 2*f0 (i.e., 30 kHz), 4*f0 (i.e., 60 kHz), 8*f0 (i.e., 120 kHz), 16*f0 (i.e., 240 kHz), etc., all with a CP overhead of 7 percent. It could also include f0/2, f0/4, etc., all with a CP overhead of 7 percent.

Whenever the numerology is doubled with the CP overhead remaining the same, a resource element 302 will become twice as great in frequency and half as long in time. A larger subcarrier spacing allows for a greater bandwidth span of each resource element but a smaller duration of time for each resource element. So, for every doubling of the numerology, the bandwidth of a resource element might be doubled and the time allotted to the resource element might be cut in half. Changing the resource elements in these dimensions (according to scaled numerology), allows for greater flexibility in dealing with multiple (and different quality) channels. Every physical channel, for example depending on multipath, might be different from another, so there might be a benefit by being able to change numerology depending on the physical channel being used.

CP overhead is described as follows. Whatever is transmitted in one symbol, a certain percentage of the end of the symbol is copied and inserted at the beginning of the symbol. CP is done in consideration of, for example, multipath. By use of CP, some part of the symbol in the time domain is being repeated for purposes of handling the multipath. In practice, the symbol might be created, then the end of the symbol is copied and inserted at the beginning of the symbol. This CP overhead is not used as data, but is instead used, for example, to handle multipath.

When a UE is configured for operation in transmission mode 9 in LTE, it might assume that the precoding granularity is defined in terms of multiple resource blocks in the frequency-domain. It might also assume, because in LTE the subcarrier spacing is fixed at 15 kHz and every resource block has 12 subcarriers, that N resource blocks describe/define a fixed and determinable bandwidth span of N*15*12 kHz. The demodulation reference signals (DMRS) are precoded in the same way for the scheduled RBs that belong in the same precoding resource group (PRG). This helps for channel estimation, because the UE can assume that the same precoder is used in a longer bandwidth (i.e., it might assume that the same precoder is used in N consecutive RBs) and therefore perform an enhanced channel estimation, e.g., "average-out" the noise over the N consecutive RBs.

In some aspects, when the UE can evaluate/detect/infer/be-informed of the PRG used for the perceived interference, then the UE can potentially change its interference cancellation/interference suppression (IC/IS) procedures accordingly. In some aspects, a UE might identify interference from a neighbor cell, evaluate whether PRGs are used for that interference, and adapt IC/IS procedures based on the evaluation. However, if the span (in Hz) of the RBs change from one RB to the next RB, either because the subcarrier spacing changes, or the number of subcarriers in each RB changes, or both, then just having knowledge of the PRG is no longer useful.

Once the span of an RB that could be used changes, e.g., once different subcarrier spacings are used, what is important is not how many RBs keep the precoder the same, but rather it is how the bandwidth is shared among neighboring base stations (e.g., neighboring scheduling entities). Therefore, a notion of bandwidth group (BWG) might be useful to identify an amount of bandwidth that can shared by a common transmission parameter, e.g., by a common precoder.

By way of example, using a scaled numerology family in 5G NR, there could be one PRB having 16 subcarriers with 15 kHz of subcarrier spacing, or having 16 subcarriers with 30 kHz of subcarrier spacing. The latter will have twice the bandwidth of the former, yet still be a single PRB. If the span of the subcarriers change, then the span of the PRB changes.

In some aspects, the number of subcarriers per resource block (RB) might change from scheduling entity to scheduling entity and/or from time-to-time within a given scheduling entity. For example, the number of subcarriers per RB for one scheduling entity might be 12 subcarriers with 60 kHz subcarrier spacing (SCS) (e.g., SCS=4*f0, where f0=15 kHz), while the number of subcarriers per RB for another scheduling entity might be 16 subcarriers with 15 kHz subcarrier spacing (e.g., SCS=f0, where f0=15 kHz). If the number of subcarriers change, then the span of the PRB changes.

By way of example, a UE might have a first scheduling entity as its serving scheduling entity. The UE might be in the vicinity of three scheduling entities including the first scheduling entity. The UE might receive interference from a second scheduling entity broadcasting with RBs having 12 subcarriers per RB with 60 kHz spacing and a third scheduling entity broadcasting with an RBs having 16 subcarriers per RB with 15 kHz spacing. To ease the burden on channel estimation and interference estimation, it is desirable to have all three scheduling entities use the same precoder over a given bandwidth. If the first scheduling entity wishes to maintain a given bandwidth within which one precoder is used by all of the scheduling entities, it will be desirable to express that amount in Hertz, in bandwidth, rather than in the number of resource blocks sharing the same precoder because the size of the RBs change from scheduling entity to scheduling entity.

As used herein, a bandwidth group (BWG) might be defined as a minimum bandwidth (e.g., in Hz) span for which some transmission parameters are kept constant in all resource blocks inside this bandwidth span. The BWG might be a bandwidth occupied by downlink subcarriers within which one or more transmission parameters might be maintained (e.g., kept constant). This defines a grid on the frequency domain using multiples of the BWG. In some aspects, a possible transmission parameter that might be kept constant within the BWG might include the precoder. In other aspects, possible transmission parameters that might be kept constant might include the precoder, the rank (e.g., number of layers), the modulation order (e.g., QPSK, 16-QAM, 64-QAM, 256-QAM), the power inside each bandwidth group (e.g., transmitted power in each RB), and/or the numerology (e.g., subcarrier spacing and symbol duration, and CP overhead).

The BWG might be used to make the UEs aware of the boundaries between which certain transmission parameters (e.g., precoder) may change for purposes of channel estimation and interference estimation. The examples described herein may decouple BWG from RB size, and link it to actual bandwidth, so as to enable consistent channel/interference estimation across the entire BWG, despite scalable numerology.

For example, if the system bandwidth is 10 MHz and a bandwidth group (BWG) is 0.5 MHz, then one can assume that within each 0.5 MHz span (within the 10 MHz system bandwidth), that some parameters (not necessarily just the precoder but other transmission parameters or properties) can be assumed to be constant. All subcarriers inside the bandwidth given by the BWG will keep the same transmission parameters. For example, a precoder might be one transmission parameter that is constant for all subcarriers that are inside the BWG. In a given BWG, subcarriers are grouped together to have the same transmission parameters. As used herein, the terms "subcarriers," "tones," and "resource elements of the same symbol" might be synonymous.

Figure 5:
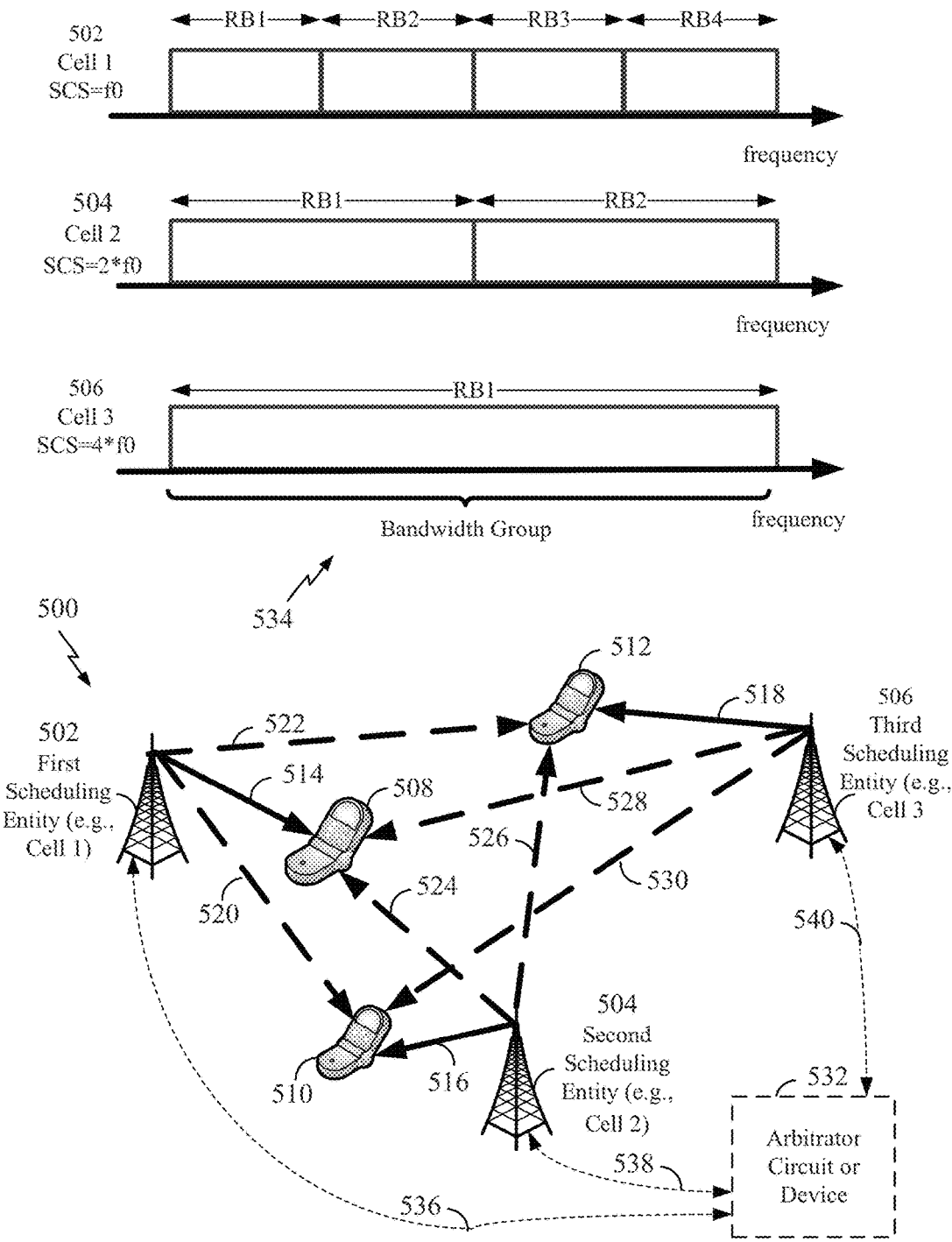
FIG. 5 illustrates a wireless communication system including exemplary neighboring scheduling entities (e.g., cell 1, cell 2, cell 3) and scheduled entities in accordance with some aspects of the disclosure.

FIG. 5 illustrates a wireless communication system 500 including exemplary neighboring scheduling entities 502, 504, 506 (e.g., cell 1, cell 2, cell 3) and scheduled entities 508, 510, 512 in accordance with some aspects of the disclosure. The wireless communication system 500 might illustrate, for example, aspects of the radio access network 100 illustrated in FIG. 1. The wireless communication system 500 might include neighboring scheduling entities 502, 504, 506 and scheduled entities 508, 510, 512. The scheduling entities 502, 504, 506 might be examples of one or more of the base stations 110, 112, 114, 118 described with reference to FIG. 1. Similarly, the scheduled entities 508, 510, 512 might be examples of one or more of the UEs 122, 124, 126, 128, 130, 132, 134, 136, 138, 140, and 142 described with reference to FIG. 1. The wireless communication system 500 illustrates serving transmissions 514, 516, 518 and interfering transmissions 520-530. For example, scheduled entity 508 might be served by scheduling entity 502 and the serving scheduling entity 502 might transmit a serving transmission 514 to scheduled entity 508. In the wireless communication system 500, scheduling entity 504 might transmit serving transmission 516 to scheduled entity 510 using the same frequency resources as serving transmission 514. In the wireless communication system 500, scheduling entity 506 might transmit serving transmission 518 to scheduled entity 512 using the same frequency resources as serving transmission 514 and serving transmission 516.

Serving transmission 514, by scheduling entity 502, might result in interfering transmissions 520, 522 received by scheduled entity 510 and scheduled entity 512, respectively. Serving transmission 516 by scheduling entity 504 might result in interfering transmissions 524, 526 received by scheduled entity 508 and scheduled entity 512, respectively. Serving transmission 518 by scheduling entity 506 might result in interfering transmission 528, 530 received by scheduled entity 508 and scheduled entity 510, respectively. FIG. 5 illustrates downlink serving transmissions and interfering transmissions. However, similar interference issues might occur on the uplink for reception of scheduled entity transmissions at scheduling entities 502, 504, 506.

FIG. 5 also illustrates a bandwidth group 534, negotiated and agreed upon between the three neighboring scheduling entities 502, 504, 506. An arbitrator circuit or device 532, or circuitry at any and/or all of the scheduling entities 502, 504, 506, might be used to reach the negotiated bandwidth group 534. Communication necessary to effect the negotiation might travel via backhaul links 536, 538, 540 coupling the scheduling entities 502, 504, 506 and the arbitrator circuit or device 532. In some aspects, one of the scheduling entities 502, 504, 506 might be a master while other ones of the scheduling entities 502, 504, 506 are slaves. In such a case, the master might be an arbitrator circuit or device for purposes of negotiation of the bandwidth group 534.

It is noted that any scheduling entity 502, 504, 506 or the arbitrator circuit or device 532, might note that inter-cell interference is rising (e.g., rising above a predefined threshold). Noting that inter-cell interference is rising above a predefined threshold might trigger the scheduling entity, or arbitrator circuit or device 532, to begin negotiation for a BWG. Other triggers might also cause negotiation to begin.

In the illustration of FIG. 5, the bandwidth group 534 negotiated between the three scheduling entities 502, 504, 506 is large enough to ensure that interference from neighboring scheduling entities 502, 504 toward scheduling entity 506 will not substantially change during the resource block, RB1, established for scheduling entity 506.

In the illustration of FIG. 5, the first scheduling entity 502 transmits with a subcarrier spacing (SCS) of f0, where f0 is a nominal SCS that might be established by a standard setting body and/or agreed to by all scheduling entities. In some aspects, the value of f0 might be a part of a standard set by a standard setting body such as the 3rd Generation Partnership Project (3GPP). The second scheduling entity 504 transmits with a subcarrier spacing (SCS) of 2*f0. The third scheduling entity 506 transmits with a subcarrier spacing (SCS) of 4*f0.

In the example of FIG. 5, the scheduling entities 502, 504, 506 might have agreed, through communications via the backhaul links 536, 538, 540, for example, that in the deployment depicted in FIG. 5, that the bandwidth group would be large enough to encompass the resource block (e.g., RB1) of the third scheduling entity 506. By agreeing on this BWG 534, scheduling entity 506 can be assured that interfering transmissions 522, 526 received at scheduled entity 512 (the UE being served by the third scheduling entity 506) will be substantially constant during transmission of the resource block, RB1, to the scheduled entity 512 during the serving transmission 518. Similarly, each scheduling entity 502, 504, 506 can rely on the fact that regardless of the SCS used in any of its transmissions, that for a given and predetermined bandwidth, the transmission parameters of neighboring cells will be unchanged.

In the illustration of FIG. 5, the three scheduling entities 502, 504, 506 might agree to have a bandwidth group that is not less than the span of at least one RB used by the cell having the maximum numerology. In other words, for example, inside one RB the precoder is constant. The agreement might be on the minimum BW span for which some transmission parameters are kept constant. Such agreement could happen by neighbor cells exchanging the value of the bandwidth (e.g., value of the BWG) outright. In some aspects, such agreement could happen by neighboring cells exchanging a set of parameters, such as the subcarrier spacing (SCS), the number of resource blocks (RBs)-per-group, and the number of subcarriers-per-RB, where the value of the BWG is equal to the product of these three quantities (i.e., Value of BWG=SCS*(number of RBs-per-group)*(number of subcarriers-per-RB)).

Possible transmission parameters that might be kept constant within the agreed bandwidth span may include, but are not limited to the precoder, the rank, the modulation order, the power inside each bandwidth group, and/or the numerology.

All neighbors should agree only on the minimum size of the BWG, and then they can use any multiple of such bandwidth.

In the example of FIG. 5, the scheduling entities 502, 504, 506 might agree on at least the size of RB1 transmitted by the third scheduling entity 506 (e.g., cell 3). Otherwise, the user of the third scheduling entity 506 (e.g., scheduled entity 512) will not experience constant interference, even inside one RB, which would lead to poor interference suppression.

With reference to FIG. 5, it is noted that each RB can be used for scheduling a different user.

In the example of FIG. 5, if the cells do not agree on a BWG, each cell might transmit different interference to UEs being served by the cells in a given resource block. For example, scheduled entity 512 would receive interference from scheduling entity 502 and scheduling entity 504 that would change throughout the RB being received by scheduled entity 512. However, once the scheduling entities 502, 504, 506 agree on at least the size or bandwidth of RB1 transmitted by scheduling entity 506, and establish that bandwidth as a BWG 534, then the user of scheduling entity 506 (e.g., scheduled entity 512) should experience relatively constant interference inside the RB transmitted by scheduling entity 506, which can lead to improved interference suppression.

In some cases, the group of neighboring cells might not be able to agree on a BWG that is the same size or larger than the largest RB in the group of neighboring cells. In this example, if the cells cannot agree on a BWG that is the same size or larger than the largest RB size used by those cells, then the cell that will be affected might inform its served UEs that interference can potentially change within one RB. In this case, the cell could inform the served UE of the portion of the RB (typically it might be ½ or ¼ of the RB) that has a constant interference (where the remainder of the RB will have a non-constant interference).

Figure 6:
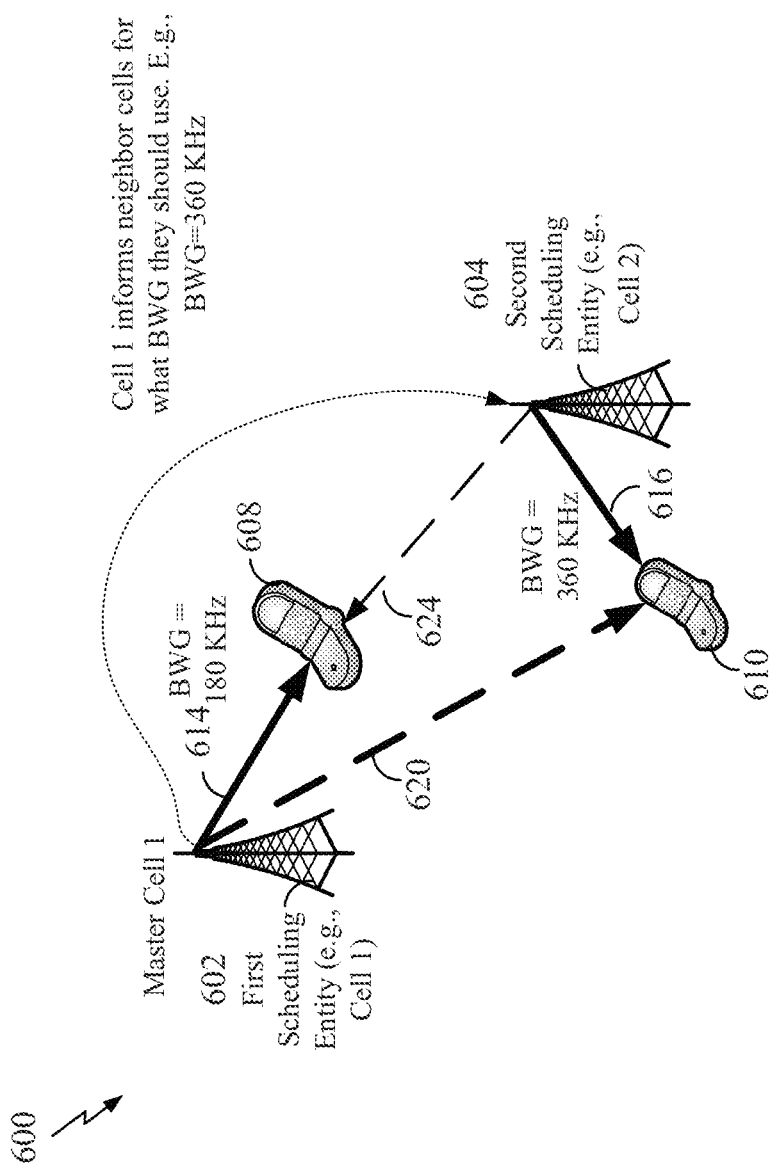
FIG. 6 illustrates a wireless communication system including exemplary neighboring first scheduling entity (e.g., cell 1), second scheduling entity (e.g., cell 2), first scheduled entity (e.g., UE 1), and a second scheduled entity (e.g., UE 2) in accordance with some aspects of the disclosure.

FIG. 6 illustrates a wireless communication system 600 including exemplary neighboring first scheduling entity 602 (e.g., cell 1), second scheduling entity 604 (e.g., cell 2), first scheduled entity 608 (e.g., UE 1), and a second scheduled entity 610 (e.g., UE 2) in accordance with some aspects of the disclosure. The first scheduled entity 608 might be served by the first scheduling entity 602 with serving transmission 614. The second scheduled entity 610 might be served by the second scheduling entity 604 with serving transmission 616. Interfering transmission 620 from the first scheduling entity 602 arrives at the second scheduled entity 610. Likewise, interfering transmission 624 from the second scheduling entity 604 arrives at the first scheduled entity 608. In the example of FIG. 6, the first scheduling entity 602 is a master scheduling entity. The second scheduling entity 604 might be a slave to the master. In some aspects, the second scheduling entity 604 might be a pico cell. In some aspects, for example in LTE, the second scheduling entity might not have paid for the spectrum or is unlicensed yet helps the master scheduling entity with master scheduling entity's own users but also tries to give the best performance it can to its own users.

Accordingly, in the example of FIG. 6, a negotiation between the neighboring scheduling entities (e.g., first scheduling entity 602 and second scheduling entity 604) need not occur. In the example of FIG. 6, the first scheduling entity 602 might inform the second scheduling entity of a specific BWG that should be used. In one example, the BWG is semi-static and can be used until the first scheduling entity directs the second scheduling entity to use a different BWG. For exemplary purposes, the first scheduling entity 602 might inform the second scheduling entity 604 to use a BWG equal to 360 kHz. The second scheduling entity 604 would comply and transmit its next RBs, for at least a bandwidth of 360 kHz using predetermined and unchanging transmission parameters. However, the master first scheduling entity 602 is not bound to use the same BWG and might use a smaller BWG. For example, the first scheduling entity 602 might use a BWG of 180 kHz.

The effect of the example of FIG. 6 results in an ability of a wireless communication system 600 to have a first BWG for channel estimation and a second BWG for noise estimation. In the example of FIG. 6, the first scheduling entity 602 (by virtue, for example, of it being a master scheduling entity) might have priority while negotiating the BWG with its neighbors. For example, the first scheduling entity 602 might use MIMO and for this, or some other reason, uses a precoder. The beams transmitted from the first scheduling entity 602 might be constant every 180 KHz. This means that the serving transmission 614 is constant every 180 kHz, and also means that the interfering transmission 620 is also constant every 180 kHz. However, the beams transmitted from the second scheduling entity 604 might be constant for 360 KHz. This means that the serving transmission 616 is constant every 360 kHz, and also means that the interfering transmission 624 is also constant every 360 kHz.

This in turn means that for the first scheduled entity 608, channel estimation (e.g., estimation of the channel for the desired serving transmission 614 destined for the first scheduled entity 608) changes every 180 kHz, but noise estimation (e.g., estimation of noise received from the interfering transmission 624) changes every 360 kHz. For the second scheduled entity 610, it is the other way around. Namely, for the second scheduled entity 610, channel estimation changes every 360 kHz, but noise estimation changes every 180 kHz.

In the example of FIG. 6, the two scheduling entities therefore transmit with a different BWGs to, for example, permit the first scheduling entity to have better noise estimation for its user (e.g., first scheduled entity 608). That is, the first scheduling entity can have better noise estimation for its user because it has forced the second scheduling entity (either through negotiation or by virtue of a master-slave relationship) to maintain transmission properties for twice the bandwidth in comparison to its own transmission property bandwidth. Accordingly, the user of the first scheduling entity (e.g., first scheduled entity 608) might have a first BWG with a constant channel and a different second BWG with a constant interference. In such an example, the first scheduling entity 602 should notify the first scheduled entity 608 that for channel estimation purposes, the BWG is 180 kHz and for noise interference purposes the BWG is 360 kHz. Similarly, the second scheduling entity 604 should notify the second scheduled entity 610 that for channel estimation purposes the BWG is 360 kHz and for noise interference purposes the BWG is 180 kHz. Signaling of both these two numbers/configurations might be needed in this scenario for accurate channel estimation and interference estimation.

In the example of FIG. 6, the first scheduling entity 602 is not helping the user of the second scheduling entity 604 (e.g., second scheduled entity 610) because the first scheduling entity 602 is not increasing the BWG to the same width as that being used by the second scheduling entity 604. Instead, the first scheduling entity 602 is instructing the second scheduling entity 604 to increase the BWG of the second scheduling entity 604 to help its own user (e.g., first scheduled entity 608). The user of the second scheduling entity 604 is not being helped by this example, because the interference seen by the user of the second scheduling entity is 180 kHz. This provides a benefit of priority for the first scheduling entity 602 because the user of the first scheduling entity is obtaining a situation that is better than the user of the second scheduling entity. The user of the first scheduling entity 602 might obtain, for example, good beam forming (because the BWG is small and the precoder can therefore change rapidly) and good interference estimation because the precoder of the interfering transmitter does not change as rapidly.

Figure 7:
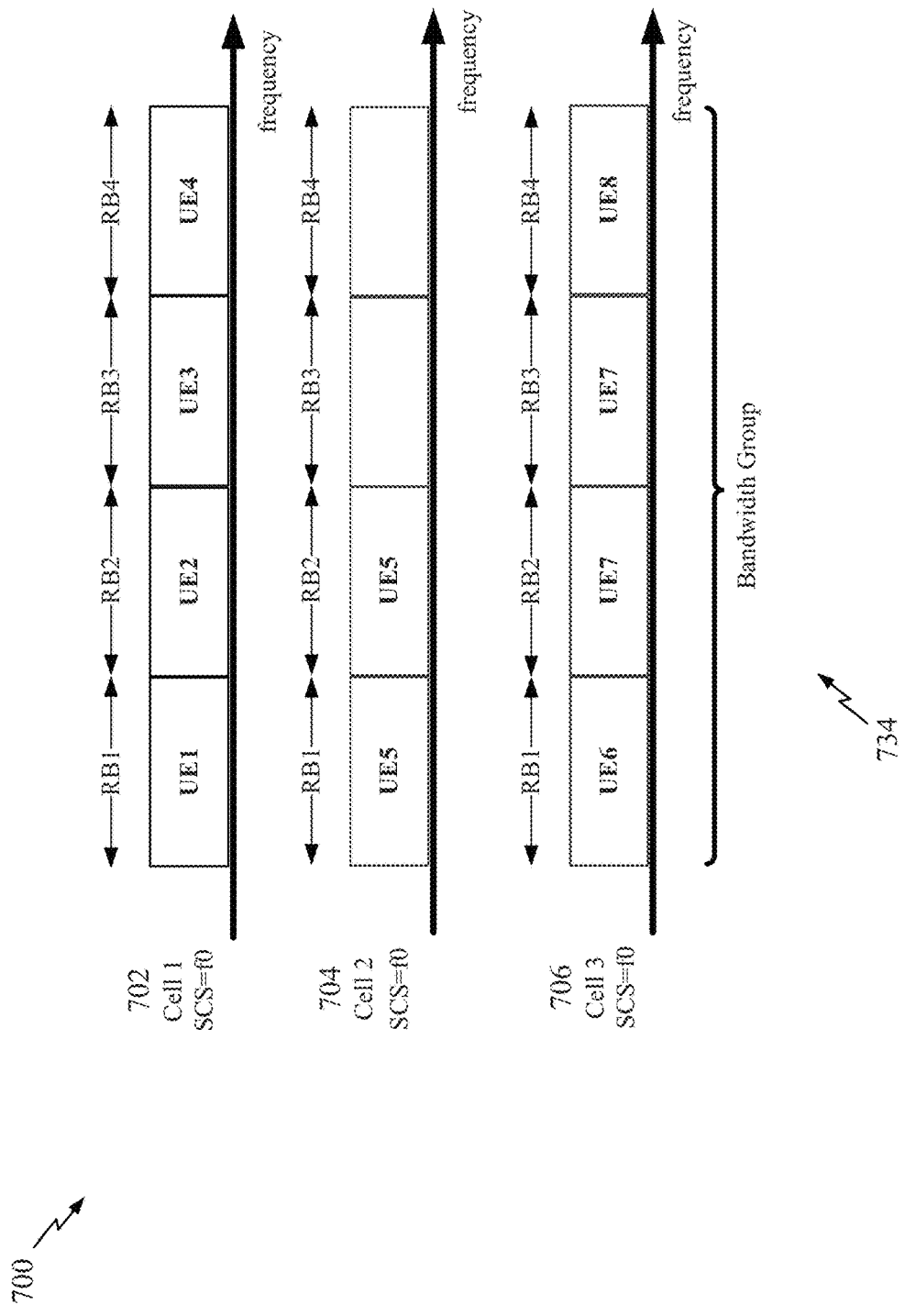
FIG. 7 is an illustration of resource blocks simultaneously transmitted from three neighboring scheduling entities in accordance with some aspects of the disclosure.

FIG. 7 is an illustration of resource blocks 700 simultaneously transmitted from three neighboring scheduling entities in accordance with some aspects of the disclosure. In the example of FIG. 7, three scheduling entities (first scheduling entity 702 (e.g., cell 1), second scheduling entity 704 (e.g., cell 2), and third scheduling entity 706 (e.g., cell 3)) each make use of the same subcarrier spacing (SCS). In the example, the utilized SCS is a nominal value of "f0" that might be defined statically by a telecommunication standard. The three scheduling entities have already negotiated a BWG 734 that is equivalent to four resource blocks; however, a BWG need not be an integer multiple of any resource block.

In the example of FIG. 7, each of the three scheduling entities 702, 704, 706 will abide by an agreement reached between them; they will all use the same BWG 734 for purposes of channel estimation and interference estimation. For example, all three scheduling entities 702, 704, 706 will all transmit with the same precoder inside the agreed upon BWG 734. In another aspect, all three scheduling entities 702, 704, 706 will all transmit using the same numerology.

In the example of FIG. 7, the neighboring scheduling entities 702, 704, 706 all transmit demodulation reference signals (DMRS) even if they do not schedule a UE for downlink in some portion of the a BWG 734. This is expected in order to maintain the agreement to maintain using the same precoder throughout the BWG 734. In other words, the second scheduling entity 704 should not fall silent during the third and fourth resource blocks (RB3, RB4) because doing so would adversely affect the interference estimation for the first scheduling entity 902 and the third scheduling entity 906. There are proposed herein several solutions to this issue.

In the example of FIG. 7, the first scheduling entity 702 schedules UE1 in the first resource block, UE2 in the second resource block, UE3 in the third resource block, and UE4 in the fourth resource block. The second scheduling entity 704 schedules UE5 in the first resource block, UE5 in the second resource block, and does not schedule any other UEs in the third resource block and the fourth resource block. The third scheduling entity 706 schedules UE6 in the first resource block, UE7 in the second resource block, UE7 in the third resource block, and UE8 in the fourth resource block.

As described, the second scheduling entity 704 has not scheduled any user for the third resource block or the fourth resource block. However, the second scheduling entity 704 will transmit DMRS using the same precoder/rank/power in RB3 and RB4, (not any data necessarily because no user is scheduled), otherwise the interference towards the other scheduling entities will not be constant. If data is not scheduled though, there is going to be an interference mismatch (less interference than what is actually measured on DMRS).

In order to address this issue, it might be desirable to send additional data in the third and fourth RBs together with the DMRS that could be used for decoding; however, additional data might not be available. It might therefore be desirable to send dummy DMRS (e.g., DMRS without data, pilot signals without data) in the third and fourth RBs; however, such a configuration might not be allowed. According to some aspects, there might be signaling to announce whether use of a dummy DMRS (e.g., pilots without data) is allowed. The signaling might be semi-static. Semi-static signaling typically refers to radio resource control (RRC) signaling. It is higher layer signaling and it is relatively slow and not dynamic. Dynamic signaling is the downlink control information (DCI) that can be in every slot. Another type of signaling is the medium access control (MAC) layer signaling, which is not dynamic again, but it might faster than the RRC signaling. Both MAC control element (CE) and RRC are transmitted as data inside the slot, so the receiver needs to decode the DCI of the slot, then demodulate/decode the data to get the other (higher layer) signaling.

If dummy DMRS is not allowed, there might still be ways to solve this issue. For example, as a first solution, the first and second RBs could be repeated in the third and fourth RBs. As a second solution, additional parity bits of the encoded information transmitted in the first and second RBs could be transmitted in the third and fourth RBs. As a third solution, dummy data could be transmitted in the third and fourth RBs. As a fourth solution, a different modulation and coding scheme (MCS) for all of the RBs could be used, such that the entire bandwidth of the BWG was used transmit the data that would originally occupy only the bandwidth slated for the first and second RBs. In other words, that data that would originally occupy only the bandwidth slated for the first and second RB could be modulated in an MCS that would span the data across the entire BWG 734. In some aspects, this could be used to improve the quality of the serving transmission. Which solution is used might be signaled to the scheduled entity (e.g., UE) or be negotiated according to the abilities of the scheduled entity and the scheduling entity (e.g., base station).

According to still another solution, a rule might be instituted that states that if a UE is scheduled only in a portion of a BWG, and dummy DMRS are not allowed, then the UE might be scheduled in the whole BWG. Again, in other words and by example, the data that would originally occupy only the bandwidth slated for the first and second RB could be modulated in an MCS that would span the data across the entire BWG 734. But, because this might be an instituted rule, the base station might not signal that this is the chosen solution, because it might be an implicit rule that is part of the standard or specification and both the base station and the UE must follow the implicit rule.

Figure 8:
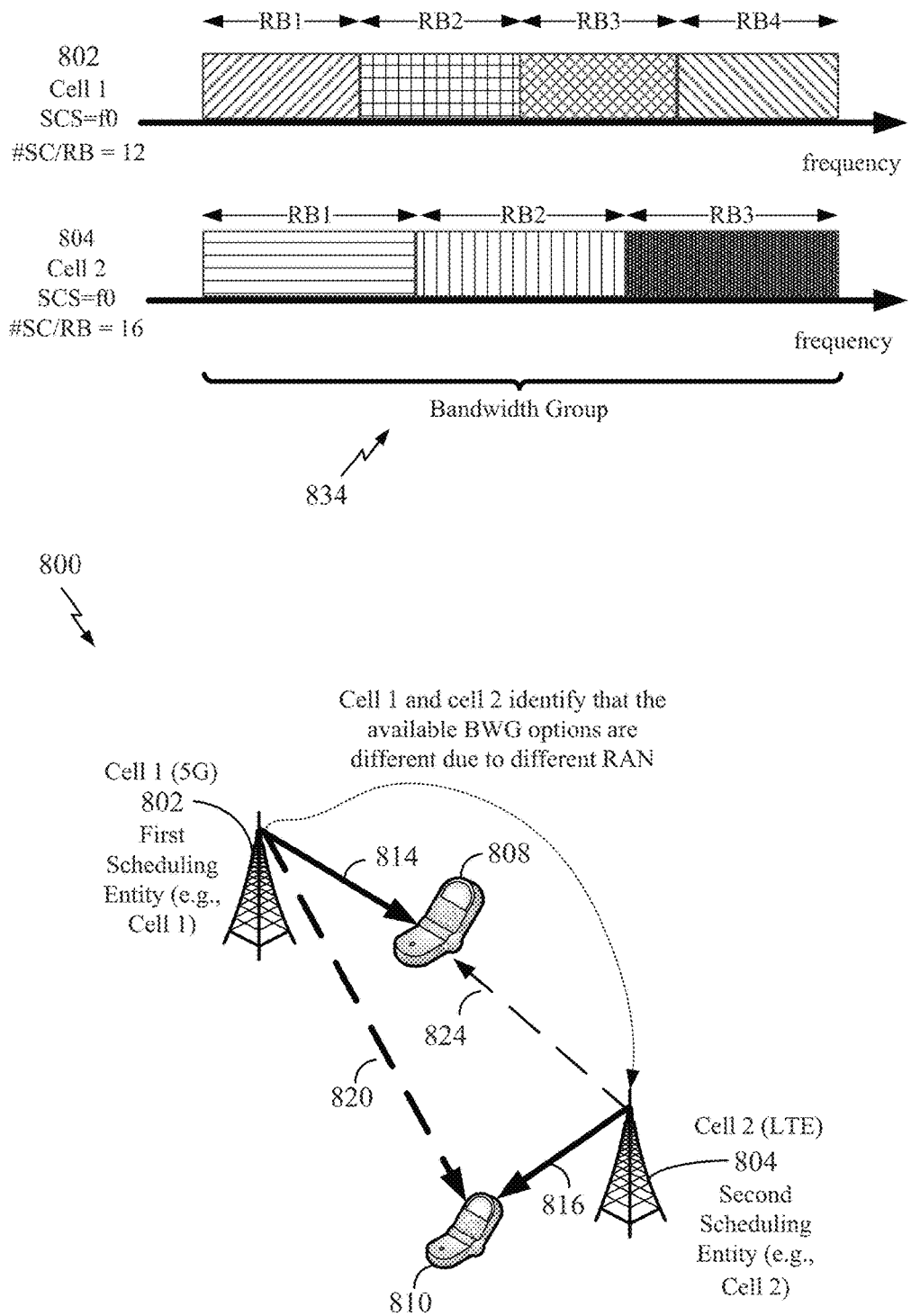
FIG. 8 illustrates a wireless communication system including exemplary neighboring scheduling entities (e.g., cell 1 (5G), cell 2 (LTE)) and scheduled entities in accordance with some aspects of the disclosure.

FIG. 8 illustrates a wireless communication system 800 including exemplary neighboring scheduling entities 802, 804 (e.g., cell 1 (5G), cell 2 (LTE)) and scheduled entities 808, 810, in accordance with some aspects of the disclosure. The wireless communication system 800 might illustrate, for example, aspects of the radio access network 100 illustrated in FIG. 1. The wireless communication system 800 might include neighboring scheduling entities 802, 804 and scheduled entities 808, 810. The scheduling entities 802, 804 might be examples of one or more of the base stations 110, 112, 114, 118 described with reference to FIG. 1. Similarly, the scheduled entities 808, 810 might be examples of one or more of the UEs 122, 124, 126, 128, 130, 132, 134, 136, 138, 140, and 142 described with reference to FIG. 1. The wireless communication system 800 illustrates serving transmissions 814, 816 and interfering transmissions 820, 824. For example, scheduled entity 808 might be served by scheduling entity 802 and the serving scheduling entity 802 might transmit a serving transmission 814 for scheduled entity 808. In the wireless communication system 800, scheduling entity 804 might transmit serving transmission 816 to scheduled entity 810 using the same frequency resources as serving transmission 814.

In the wireless communication system 800, the first scheduling entity 802 might operate according to a first standard (e.g., a 5G standard) while the second scheduling entity 804 might operate according to a second standard (e.g., an LTE standard), different from the first standard. In some aspects, such as with 5G NR and LTE, the first scheduling entity 802 and second scheduling entity 804 might operate on the same time and frequency grid. However, the first scheduling entity 802 and the second scheduling entity 804 might identify that the available BWG options are different due to different radio access networks (RANs). If the RB sizes (in bandwidth) across interfering RANs are not multiples of each other, then the cells might need to agree on a common multiple of their RB sizes if their RAN specifications allow for such configuration.

In some aspects, restrictions might be placed on the options of a BWG. For example, one option might be that the BWG might be a common multiple of the bandwidth of the PRBs of both RANs. That is, one option might be that the BWG might be a common multiple of the bandwidth of the PRBs of both a first scheduling entity 802 and the second scheduling entity 804. In other words, wherein the BWG is a common multiple of a bandwidth of resource blocks of the scheduling entity and resource blocks of the neighboring scheduling entity. In the example of FIG. 8, the first scheduling entity 802 has a subcarrier spacing set equal to the nominal static value of f0 (e.g. a nominal value set by a telecommunication, wireless communication standard setting body, 15 kHz). The subcarrier spacing of the second scheduling entity 804 is also set equal to the nominal static value of f0. However, in the first scheduling entity 802, the number of subcarriers per resource block (#SC/RB) is equal to 12. In the second scheduling entity 804, the number of subcarriers per resource block (#SC/RB) is equal to 16. Therefore, the occupied bandwidth size of each resource block in the second scheduling entity 804 is larger than that of the first scheduling entity 802. The sizes are not integer multiples of one another. According to the optional aspect of FIG. 8, the size of the bandwidth group could be matched between the two serving entities in that four resource blocks of the first scheduling entity 802 are equal in bandwidth span to three resource blocks of the second scheduling entity 804. In the example of FIG. 8, it is noted that there might be restrictions on the precoding of serving transmission in a 4G (e.g., 4G, LTE, LTE-A) network. Accordingly, it is possible that a non-4G scheduling entity, such as the second scheduling entity 804 might not ask a 4G scheduling entity, such as the first scheduling entity 802 to do things that would not be allowed according to its 4G standard. Therefore, the BWG might desirably be set to be equal to, or an integer multiple of, what is allowed in 4G. Accordingly, if the second scheduling entity 804 is of a non-4G radio access network (RAN) and if the first scheduling entity 802 is of a 4G RAN, then the size (e.g., span) of the BWG is a common multiple of the bandwidth of a physical resource block of each of the non-4G RAN and the 4G RAN.

Figure 9:
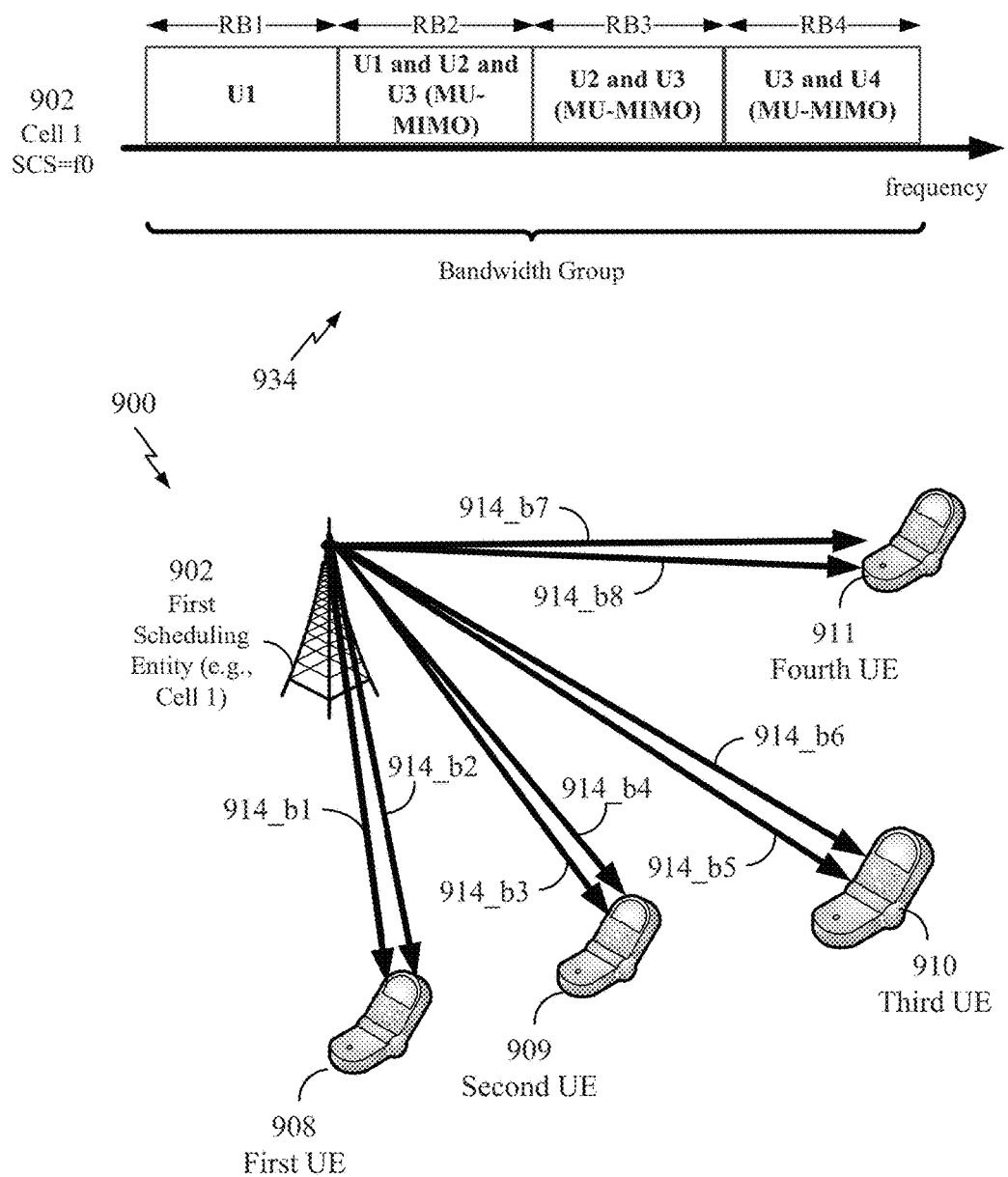
FIG. 9 illustrates a wireless communication system including a first scheduling entity (e.g., a 5G scheduling entity) and four UEs in accordance with some aspects of the disclosure.

FIG. 9 illustrates a wireless communication system 900 including a first scheduling entity 902 (e.g., a 5G scheduling entity) and four UEs 908, 909, 910, and 911 in accordance with some aspects of the disclosure. In the example of FIG. 9, one scheduling entity transmits to four UEs and it is assumed, for ease of explanation, that no neighboring scheduling entities are interfering with the serving transmission of the first scheduling entity 902. The wireless communication system 900 might illustrate, for example, aspects of the radio access network 100 illustrated in FIG. 1. The first scheduling entity 902 might be an example of one or more of the base stations 110, 112, 114, 118 described with reference to FIG. 1. Similarly, the scheduled entities, UEs 908, 909, 910, 911, might be examples of one or more of the UEs 122, 124, 126, 128, 130, 132, 134, 136, 138, 140, and 142 described with reference to FIG. 1. The wireless communication system 900 illustrates a serving transmission 914 that is comprised of 8 layers (e.g., 8 beams, each denoted by the suffix "_bx", where x=1 to 8) 914_b1, 914_b2, 914_b3, 914_b4, 914_b5, 914_b6, 914_b7, 914_b8. In one aspect, to achieve the 8 layers, the first scheduling entity 902 might use an 8 layer precoder. For example, in the wireless communication system 900, the first scheduling entity 902 might transmit serving transmission 914_b1 and serving transmission 914_b2 to first UE 908. The first scheduling entity 902 might simultaneously transmit serving transmission 914_b3 and serving transmission 914_b4 to second UE 909. The first scheduling entity 902 might simultaneously transmit serving transmission 914_b5 and serving transmission 914_b6 to third UE 910. The first scheduling entity 902 might simultaneously transmit serving transmission 914_b7 and serving transmission 914_b8 to fourth UE 911. The serving transmissions might all use the same frequency resources. According to such an aspect, all serving transmission 914_b1, 914_b2, 914_b3, 914_b4, 914_b5, 914_b6, 914_b7, 914_b8 might be transmitted simultaneously.

In the example of FIG. 9, the first scheduling entity 902 might notify all users (e.g., via signaling) of a chosen BWG 934. It might be assumed that the BWG 934 is the same for both channel estimation and interference estimation. The first UE 908 might thus understand that a given 8-layer precoder is constant throughout the span of the BWG 934. Then the first user, first UE 908, even though it is scheduled only in RB1, might still do channel estimation (and interference estimation) throughout all of the span of the bandwidth of the given BWG 934. The first UE 908 might obtain the DMRS of all RBs and might use the obtained DMRS to try to improve the channel estimation for itself (i.e., for the first UE 908); and then the first UE 908 might decode the data for only the portion of the BWG 934 for which it was scheduled. The idea of the illustration of FIG. 9 is that every user knows that the precoder (the 8-layer precoder) is constant throughout the span of the bandwidth of the BWG 934 and therefore, even though a user might have only been scheduled for a portion of the BWG 934, it is able to use all of the BWG 934 to improve its channel estimation and interference estimation.

In the scenario of FIG. 9, for RB1, for example, serving transmissions 914_b1 and 914_b2 would be used for channel estimation while serving transmissions 914_b3, 914_b4, 914_b5, 914_b6, 914_b7, and 914_b8 would be used for interference estimation.

FIG. 9 provides an example of how a first scheduling entity 902 might fix a BWG for intra-cell interference estimation. As used herein, a bandwidth group (BWG) might be a minimum bandwidth (in Hz) span for which some transmission parameters are kept constant in a PRB. This defines a grid on the frequency domain using multiples of the BWG 934. In some aspects, a possible transmission parameter that might be kept constant might include the precoder. In other aspects, possible transmission parameters that might be kept constant might include the precoder, rank (e.g., number of layers), modulation order (e.g., QPSK, 16-QAM, 64-QAM, 256-QAM), power inside each bandwidth group (e.g., transmitted power in each RB), and/or numerology.

In the example of FIG. 9: assume that the scheduling entity 902 can transmit in each PRB up to 8 layers (e.g., 8 beams in a MIMO configuration), and that it schedules 4 users 2 layers (e.g., 2 beams) each as shown in FIG. 9. In other words, the first scheduling entity 902, by incorporating MIMO techniques and appropriate hardware and software, might include multiple antennas and through beamforming techniques might simultaneously transmit up to 8 beams (e.g., 8 layers on a single transmission). Observe that in RB1, only U1 has been scheduled. Yet, the BWG 934 spans from RB1 to RB4, and therefore the same precoder should be applied to all the RBs. (RB1-RB4). Therefore, all 8 layers (2 to each user) should be transmitted at least in the DMRS of RB1, even though only UE1 is scheduled in that PRB. Similarly, all 8 layers (2 to each user) should be transmitted at least in the DMRS of RB2, even though only UE1, UE2 and UE3 are scheduled in RB2 in the example of FIG. 9. Similarly, all 8 layers (2 to each user) should be transmitted at least in the DMRS of RB3, even though only UE2 and UE3 are scheduled in RB3 in the example of FIG. 9. Similarly, all 8 layers (2 to each user) should be transmitted at least in the DMRS of RB4, even though only UE3 and UE4 are scheduled in RB4 in the example of FIG. 9.

In summary, even though data in each PRB may be transmitted at least on the scheduled RBs for each user, DMRS pilots might be transmitted in all the RBs for all eight beams. If modulation needs to be constant, then also data needs to be transmitted for all users in all of the RBs. At least three possible solutions exist.

The first solution to transmitting data in the RBs for which DMRS pilots are transmitted includes use of data padding, where data (e.g., dummy data) is sent to a UE in the remaining RBs of the BWG even if the UE is not scheduled for transmission in these RBs.

The second solution to transmitting data in the RBs for which DMRS pilots are transmitted includes use of repetition (e.g., data repeated from a previous transmission or from the scheduled RB into the remaining RBs of the BWG for which the user is not scheduled).

The third solution to transmitting data in the RBs for which DMRS pilots are transmitted includes transmitting additional parity bits of the data transmitted in the scheduled RB in the remaining RBs of the BWG for which the user is not scheduled. By way of example, each user is being scheduled in some portion of the BWG. Therefore some data are sent there, and an encoder can create additional parity bits and send them in the remaining portion of the BWG using the same beam as that used in the scheduled RB. If the encoder does not do that, then this specific beam in the remaining BWG will be silent, which is a situation that is desirably avoided.

Figure 10A:
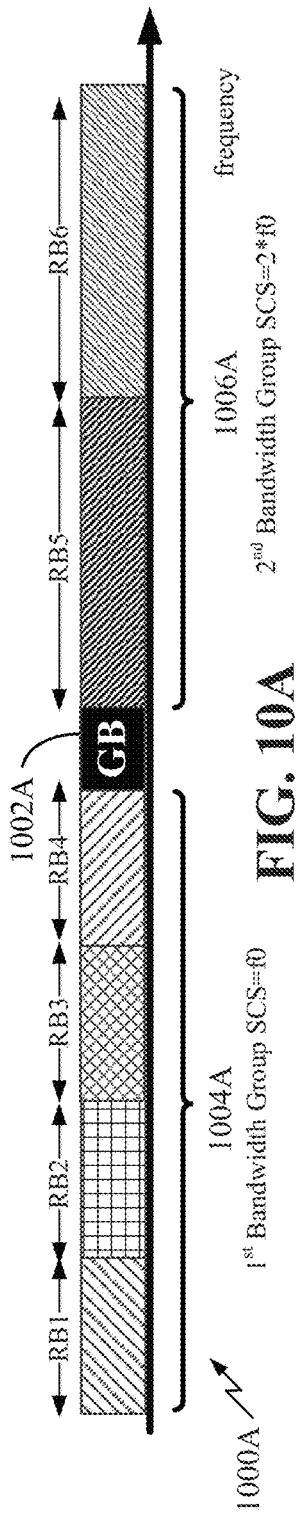
FIG. 10A, FIG. 10B, and FIG. 10C illustrate various groups of RBs and guard bands associated with first and second bandwidth groups in the frequency domain in accordance with some aspects of the disclosure.
Figure 10B:
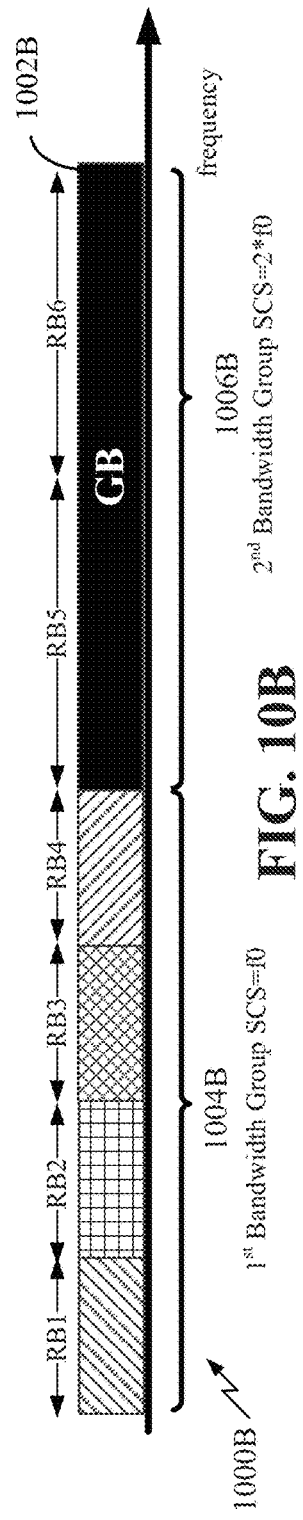
Figure 10C:
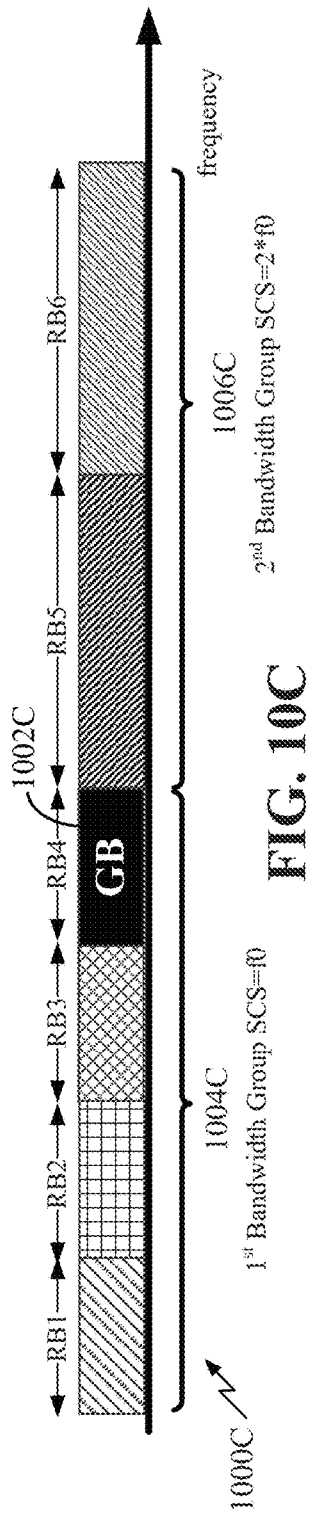

FIG. 10A, FIG. 10B, and FIG. 10C illustrate various groups of RBs and guard bands associated with first and second bandwidth groups in the frequency domain in accordance with some aspects of the disclosure. FIG. 10A, FIG. 10B, and FIG. 10C might be used in a discussion of bandwidth groups (BWGs) and the frequency division multiplexing (FDMing) of numerologies. As used herein, FDMing of numerologies might mean that on the same symbol, a serving scheduling entity will transmit some RBs using one numerology (e.g., one subcarrier spacing) and other RBs using different numerology. In aspects described herein, in the same symbol, if the subcarrier spacing is changed, then a guard band is desirable between the RBs that use the different numerology. The guard band might prevent or reduce interference between the RBs using different numerology.

A BWG might be defined to ensure that inside each BWG the same numerology is used. However, the numerology across bandwidth groups could be different. In some aspects, a guard band might be added at the BWG boundaries where subcarrier spacing (SCS) changes. As used herein, a guard band might be a predefined or negotiated bandwidth (in Hz) span that is not being allocated to any user. In general, the guard band might be an unused part of the radio spectrum between successive BWGs, and might be present for the purpose of preventing interference.

FIG. 10A illustrates a first option in which a frequency grid 1000A is redefined to skip a guard band 1002A. By redefining the grid, it is meant that it might be expected that succeeding BWGs might be continuous, however, the guard band 1002A breaks the continuity between succeeding BWGs. Accordingly, if a grid is defined with BWGs of a first size, then a UE must be informed that the grid is being redefined such that the UE might know when the BWG following the guard band 1002A begins.

According to the first option, illustrated in FIG. 10A, a first BWG 1004A and a second BWG 1006A are agreed to by all neighboring cells or assigned by a master cell or arbitrator. The size of the first BWG 1004A might be equal to or different from the size of the second BWG 1006A. In the illustration of FIG. 10A, a first BWG 1004A, including RBs with an SCS equal to f0 (e.g., RB1, RB2, RB3, RB4), is established in the bandwidth spanning an area of lesser frequency than the guard band 1002A. A second BWG 1006A, including RBs with an SCS equal to 2*f0 (e.g., RB5, RB6), is established in the bandwidth spanning an area of greater frequency than the guard band 1002A. The guard band 1002A is thus established between the two BWG boundaries where subcarrier spacing (SCS) changes.

In the example of FIG. 10A, the serving cell (not shown) might notify the UE (via signaling) (not shown) about this configuration, including, for example, the size of the guard band 1002A. The serving cell might also inform all neighbor cells about this guard band 1002A (e.g., "hole" in the radio spectrum) and/or the change to the frequency grid (e.g., the change to the frequency grid from that originally established by, for example, a scheduling circuit/function/device of a scheduling entity).

FIG. 10B illustrates a second option in which the frequency grid 1000B remains the same (e.g., is unchanged from the frequency grid agreed to or established by all neighboring cells or defined by a master cell, arbitrator, or network). In other words, the frequency grid remains unchanged independent of, for example, whether BWG are defined, or the size of the BWG, or whether different numerologies are multiplexed or not. The frequency grid might remain the same if, for example, it is forbidden by network rules (or the rules of a telecommunication standard) to redefine the grid on the fly.

According to the second option, illustrated in FIG. 10B, a first BWG 1004B and a second BWG 1006B are agreed to by all neighboring cells or assigned by a master cell or arbitrator. The size of the first BWG 1004B might be equal to or different from the size of the second BWG 1006B. In the illustration of FIG. 10B, the first BWG 1004B includes RBs with an SCS equal to f0 (e.g., RB1, RB2, RB3, RB4). The second BWG 1006B, including RBs with an SCS equal to 2*f0 (e.g., RB5, RB6), is established in the bandwidth spanning an area of greater frequency than the first BWG 1004B. According to the second option, the second BWG 1006B is not assigned/scheduled, rather it is used as the guard band 1002B. A guard band 1002B is thus established at the point where subcarrier spacing (SCS) changes between two BWG boundaries. The second option might be favored over the first option, for example, if it is not possible redefine the grid. Redefining the grid might be difficult because, for example, all cells should agree to the redefined boundaries of the BWGs of the grid.

FIG. 10C illustrates a third option in which the frequency grid 1000C remains the same and the guard band 1002C is designated to be as much as one RB of the two RBs on the boundary between where the subcarrier spacing changes on the grid.

According to the third option, illustrated in FIG. 10C, a first BWG 1004C and a second BWG 1006B are agreed to by all neighboring cells or assigned by a master cell or arbitrator. The size of the first BWG 1004C might be equal to or different from the size of the second BWG 1006C. In the illustration of FIG. 10C, the first BWG 1004C includes RBs with an SCS equal to f0 (e.g., RB1, RB2, RB3, RB4). The second BWG 1006C, including RBs with an SCS equal to 2*f0 (e.g., RB5, RB6), is established in the bandwidth spanning an area of greater frequency than the first BWG 1004C. According to the third option, one of the two RBs (e.g., RB4 or RB5) on the boundary between where subcarrier spacing (SCS) changes is used as a guard band 1002C. That is, the first BWG 1004C includes a first plurality of resource blocks and the second BWG 1006C includes a second plurality of resource blocks and a method may include defining a first resource block, of two adjacent resource blocks (e.g., RB4, RB5), on a boundary between the first BWG 1004C and the second BWG 1006C as a guard band. In some aspects, the smaller RB (e.g., RB4) might be selected to be the guard band 1002C. That is, the first resource block (e.g., RB4) might be a smaller resource block of the two adjacent resource blocks. The UE that is scheduled in this edge RB (e.g., RB4), will know that inside the BWG 1004C the RB4 does not have common transmission parameters as the remaining RBs of the BWG (i.e., RB1, RB2, RB3) and therefore it can no longer perform channel or noise estimation over the whole BWG but would need to proceed as if the BWG is smaller by one RB, or as if no BWG exists.

According to each of the three options illustrated by FIG. 10A, FIG. 10B, and FIG. 10C, all neighboring cells should know which option is being used. The option being used might be assigned by a master cell or arbitrator, or might be negotiated among the neighboring cells (e.g., the network). The UEs being served by the neighboring cells should also be informed of which option is being used. A UE might be informed via signaling between the UE and its respective serving cell. According to each of the three options illustrated by FIG. 10A, FIG. 10B, and FIG. 10C, the scheduling entity (e.g., the serving cell), transmits, to a scheduled entity (e.g., the UE), the symbol via the first BWG and the second BWG.

The notion of bandwidth group can be extended for channel state information-reference signal (CSI-RS) signals. CSI-RS are reference signals for channel state information acquisition. CSI-RS are reference signals used for something other than channel estimation for demodulation of data. CSI-RS are used to estimate channel state, which can be a more generic piece of information than is used for channel estimation purposes. For example, channel state might be estimated for many precoders, many levels, many beams, whereas the DMRS is only transmitted on one of those beams which are also used to transmit data. CSI-RS might be used for probing with broad beams, which means that the broad beams can be kept constant across a large bandwidth. The DMRS pilots (and therefore also data) might be on narrow beams (narrower than the wide beams associated with the CSI-RS), therefore these narrow beams might not be constant for a large bandwidth due to the frequency selectivity of the wireless channels. In some aspects described herein, the CSI-RS could be substituted for things mentioned herein related to the DMRS.

The CSI-RSs might have the same transmission parameters for the scheduled RBs that belong in the same CSI-RSs BWG. The cells might, similar to DMRS BWGs, transmit dummy CSI-RS if needed to satisfy the constraint of having to transmit CSI-RS in a RB of a BWG where there is no UE scheduled for the RB.

The BWG associated with the CSI-RS can be the same or can potentially be larger than the BWG associated with the DMRS. It is noted that the precoder for the DMRS follows the data; it is used to demodulate the data. On the other hand, the precoder used for the CSI-RS are used for channel state information acquisition and tracking of a plurality of beams and the associated interference in those spatial directions. The precoders of CSI-RSs are not typically used by some other channel in the same subframe. They might be used, for example, as pilots for probing beams/MIMO directions/interference, etc. If a BWG is associated with (e.g., selected for) a CSI-RS, then there should be a precoder chosen for the selected CSI-RS BWG, and the precoder for the CSI-RS BWG should be constant for the CSI-RS BWG.

In some aspects, in order to differentiate between the DMRS BWG and the CSI-RS BWG, signaling could be included as a relative difference of the CSI-RS's BWG from the DMRS's BWG (or vice versa). For example the CSI-RS's BWG could be at least the same, or twice, or four times, etc., as large as the DMRS's BWG.

The bandwidth group for CSI-RS could enforce a specific chosen numerology for CSI-RS, where the numerology for CSI-RS might be a numerology that is different than the one chosen for DMRS. Therefore, in some aspects, no matter what the data/DMRS/control numerology, the CSI-RS could have a different numerology that is fixed across all deployments. That is, it could always have SCS of f0, even if data/DMRS/control numerology has a different SCS (e.g., 2*f0, 4*f0, etc.).

The CSI-RS might have the same transmission parameters for the scheduled RBs that belong in the same bandwidth group (BWG).

The BWG for CSI-RS can potentially be larger than the DMRS BWG. Signaling could be included as a relative difference of the CSI-RS's BWG from the DMRS's BWG. (It could be at least the same, or twice, four times, etc.). For example, if a symbol is only CSI-RS, then the cells could negotiate what will be the BWG and numerology (e.g., where numerology is a combination of subcarrier spacing and CP overhead) that the cells would have to use for all of the CSI-RS in that BWG. In some aspects, for CSI-RS BWGs, the BWG might be a set of subcarriers for which the numerology (e.g., as opposed to the precoder) has been negotiated and set to a constant. In contrast, in an LTE precoder group (PCG) there is no notion of scalable numerology.

Figure 11:
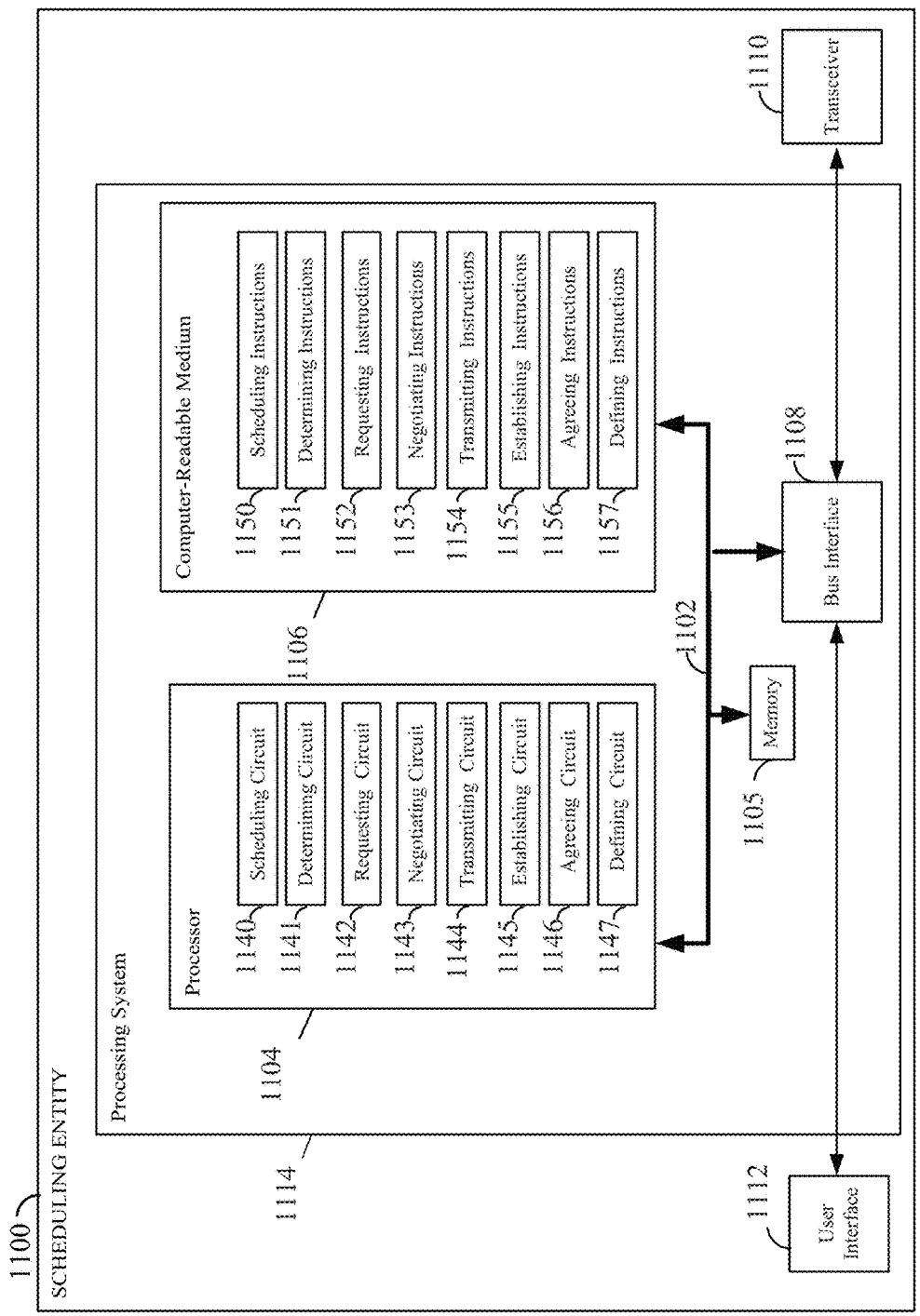
FIG. 11 is a simplified block diagram illustrating an example of a hardware implementation for a scheduling entity employing a processing system according to some aspects of the disclosure.

FIG. 11 is a simplified block diagram illustrating an example of a hardware implementation for a scheduling entity 1100 employing a processing system 1114 according to some aspects of the disclosure. For example, the scheduling entity 1100 might be a base station as illustrated in any one or more of FIGS. 1, 2, 4, 5, 6, 8 and/or 9. In some aspects, the scheduling entity 1100 might be an arbitrator circuit or device 532 as depicted, for example in FIG. 5.

The scheduling entity 1100 might be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1100 might be configured to perform any one or more of the functions described herein. That is, the processor 1104, as utilized in a scheduling entity 1100, might be used to implement any one or more of the processes described below and illustrated in FIGS. 13-16.

In this example, the processing system 1114 might be implemented with a bus architecture, represented generally by the bus 1102. The bus 1102 might include any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 might also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 provides a means for communicating with various other apparatus over a transmission medium. Depending upon the nature of the apparatus, a user interface 1112 (e.g., keypad, display, speaker, microphone, joystick) might also be provided.

In some aspects of the disclosure, the processor 1104 might include circuitry configured for various functions, including, for example, scheduling circuit 1140, determining circuit 1141, requesting circuit 1142, negotiating circuit 1143, transmitting circuit 1144, establishing circuit 1145, agreeing circuit 1146, and defining circuit 1147. For example, the circuitry 1140-1147 might be configured to implement one or more of the processes described below in relation to FIGS. 13-16.

The processor 1104 is responsible for managing the bus 1102 and general processing, including the execution of software stored on the computer-readable medium 1106. The software, when executed by the processor 1104, causes the processing system 1114 to perform the various functions described below for any particular apparatus, such as the functions described below in relation to FIGS. 13-16. The computer-readable medium 1106 and the memory 1105 might also be used for storing data that is manipulated by the processor 1104 when executing software.

One or more processors 1104 in the processing system might execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software might reside on a computer-readable medium 1106. The computer-readable medium 1106 might be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that might be accessed and read by a computer. The computer-readable medium might also include, by way of example, a carrier wave, a transmission line, and any other suitable medium for transmitting software and/or instructions that might be accessed and read by a computer. The computer-readable medium 1106 might reside in the processing system 1114, external to the processing system 1114, or distributed across multiple entities including the processing system 1114. The computer-readable medium 1106 might be embodied in a computer program product. By way of example, a computer program product might include a computer-readable medium in packaging materials. Those skilled in the art will recognize how best to implement the described functionality presented throughout this disclosure depending on the particular application and the overall design constraints imposed on the overall system.

In one or more examples, the computer-readable medium 1106 might include software configured for various functions, including, for example, scheduling instructions 1150, determining instructions 1151, requesting instructions 1152, negotiating instructions 1153, transmitting instructions 1154, establishing instructions 1155, agreeing instructions 1156, and defining instructions 1157. For example, the software instructions 1150-1157 might be configured to implement one or more of the processes described below in relation to FIGS. 13-16.

Figure 12:
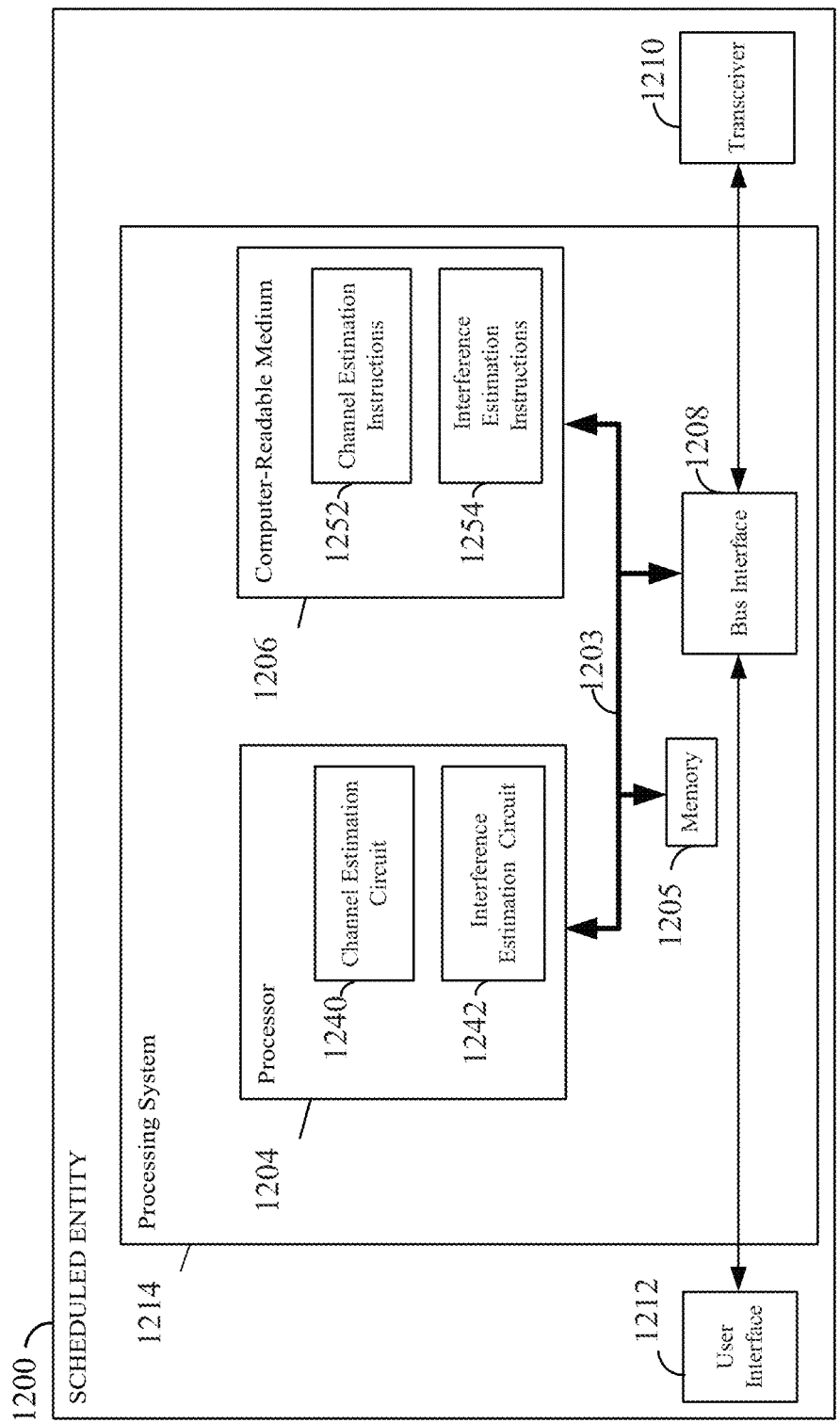
FIG. 12 is a conceptual diagram illustrating an example of a hardware implementation for an exemplary scheduled entity employing a processing system according to some aspects of the disclosure.

FIG. 12 is a conceptual diagram illustrating an example of a hardware implementation for an exemplary scheduled entity 1200 employing a processing system 1214 according to some aspects of the disclosure. In accordance with various aspects of the disclosure, an element, or any portion of an element, or any combination of elements might be implemented with a processing system 1214 that includes one or more processors 1204. For example, the scheduled entity 1200 might be a user equipment (UE) as illustrated in any one or more of FIGS. 1, 2, 4, 5, 6, 7, 8, and/or 9.

The processing system 1214 might be substantially the same as the processing system 1114 illustrated in FIG. 11, including a bus interface 1208, a bus 1202, memory 1205, a processor 1204, and a computer-readable medium 1206. Furthermore, the scheduled entity 1200 might include a user interface 1212 and a transceiver 1210 substantially similar to those described above in FIG. 11. That is, the processor 1204, as utilized in a scheduled entity 1200, might be used to implement any one or more of the processes described below and illustrated in FIGS. 13-16.

In some aspects of the disclosure, the processor 1204 might include circuitry configured for various functions, including, for example, channel estimation circuitry 1240 and interference estimation circuitry 1242. For example, the channel estimation circuitry 1240 and interference estimation circuitry 1242 might be configured to implement one or more of the processes described below in relation to FIGS. 13-16.

Figure 13:
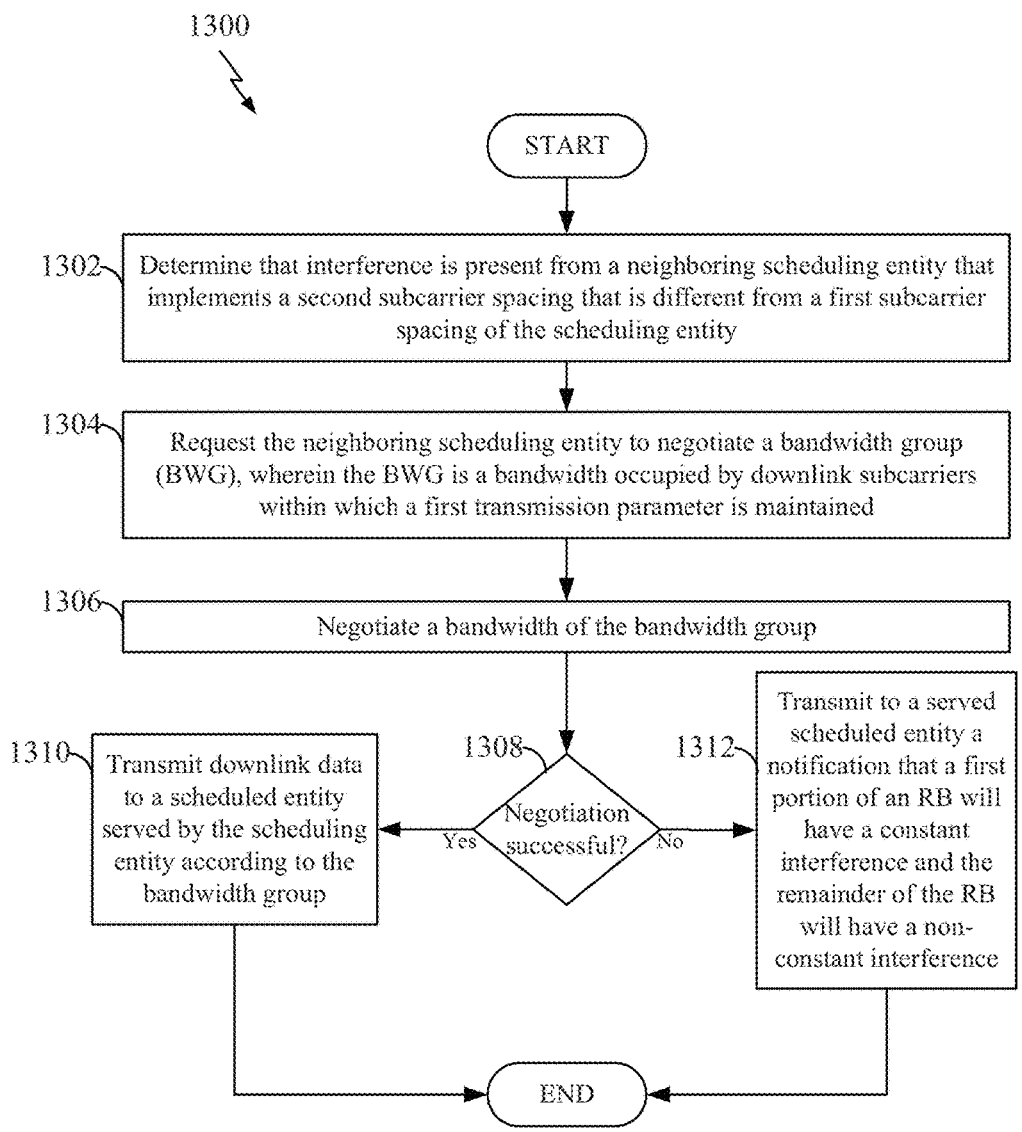
FIG. 13 is a flow chart illustrating an exemplary process for wireless communication in accordance with some aspects of the disclosure.

FIG. 13 is a flow chart illustrating an exemplary process 1300 for wireless communication in accordance with some aspects of the present disclosure. As described below, some or all illustrated features might be omitted in a particular implementation within the scope of the present disclosure, and some illustrated features might not be required for implementation of all aspects. In some examples, the process 1300 might be carried out by the scheduling entity 1100 illustrated in FIG. 11. In some examples, the process 1300 might be carried out by any suitable apparatus or means for carrying out the processes, functions, or algorithm described below.

At block 1302, a scheduling entity might determine that interference is present from a neighboring scheduling entity that implements a second subcarrier spacing that is different from a first subcarrier spacing of the scheduling entity.

At block 1304, the scheduling entity might request the neighboring scheduling entity to negotiate a bandwidth group (BWG), wherein the BWG is a bandwidth occupied by downlink subcarriers within which a first transmission parameter is maintained.

At block 1306, the scheduling entity might negotiate the bandwidth of the bandwidth group.

At block 1308, a determination might be made to see if negotiation was successful.

At block 1310, the scheduling entity might transmit downlink data to a scheduled entity served by the scheduling entity according to the bandwidth group, if negotiation was successful.

In some aspects of the method, the transmission parameter is at least one of a precoder, rank, modulation order, power inside each bandwidth group, and/or numerology.

In some aspects of the method, the numerology is scalable.

In some aspects of the method, the numerology is a combination of subcarrier spacing and cyclic prefix (CP) overhead, and the subcarrier spacing might be scaled while keeping constant the CP overhead as a percentage of a symbol duration.

In some aspects of the method, the BWG establishes the boundaries between where transmission parameters change for purposes of channel estimation and interference estimation.

In some aspects of the method, the BWG is defined by at least one of a DMRS or a CSI-RS.

In some aspects of the method, the BWG is at least as wide as a widest bandwidth resource block between the scheduling entity and the neighboring scheduling entity.

In some aspects, negotiating an agreed upon bandwidth might be achieved by exchanging at least one of a desired BWG, subcarrier spacing (SCS), number of resource blocks (RBs)-per-group, or number of subcarriers-per-RB, wherein the value of the desired BWG is equal to SCS*(number of RBs-per-group)*(number of subcarriers-per-RB).

At block 1312, the method might further comprise transmitting to a served scheduled entity a notification that a first portion of a resource block (RB) will have a constant interference and the remainder of the RB will have a non-constant interference, if negotiating is not successful.

In some aspects, wherein the first scheduling entity is of a non-4G radio access network (RAN) and if the second scheduling entity is of a 4G RAN, then the size of the BWG is a common multiple of the bandwidth of a physical resource block of each of the non-4G RAN and the 4G RAN.

Figure 14:
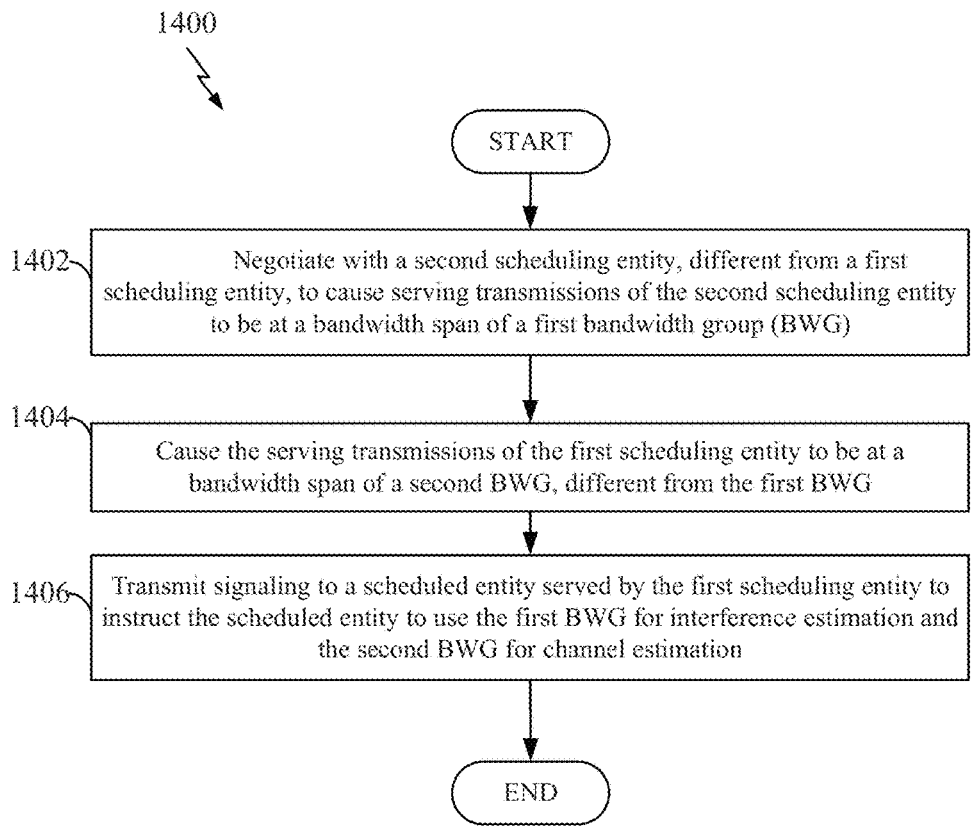
FIG. 14 is a flow chart illustrating an exemplary process for wireless communication in accordance with some aspects of the disclosure.

FIG. 14 is a flow chart illustrating an exemplary process 1400 for wireless communication in accordance with some aspects of the disclosure. As described below, some or all illustrated features might be omitted in a particular implementation within the scope of the present disclosure, and some illustrated features might not be required for implementation of all aspects. In some examples, the process 1400 might be carried out by the scheduling entity 1100 illustrated in FIG. 11. In some examples, the process 1400 might be carried out by any suitable apparatus or means for carrying out the processes, functions, or algorithm described below.

At block 1402, a first scheduling entity might negotiate with a second scheduling entity, different from the first scheduling entity, to cause serving transmissions of the second scheduling entity to be at a bandwidth span of a first bandwidth group (BWG), wherein the BWG is a bandwidth occupied by downlink subcarriers within which a first transmission parameter is maintained.

At block 1404, a first scheduling entity might cause the serving transmissions of the first scheduling entity to be at a bandwidth span of a second BWG, different from the first BWG.

At block 1406, the first scheduling entity might transmit signaling to a scheduled entity served by the first scheduling entity to instruct the scheduled entity to use the first BWG for interference estimation and the second BWG for channel estimation.

In some aspects of the method, the transmission parameter is at least one of a precoder, rank, modulation order, power inside each bandwidth group, and/or numerology.

In some aspects of the method, the numerology is scalable.

In some aspects of the method, the numerology is a combination of subcarrier spacing and cyclic prefix (CP) overhead, and the subcarrier spacing might be scaled while keeping constant the CP overhead as a percentage of a symbol duration.

In some aspects of the method, negotiating includes instructing the second scheduling entity to use the first BWG when the first scheduling entity is a master scheduling entity.

Figure 15:
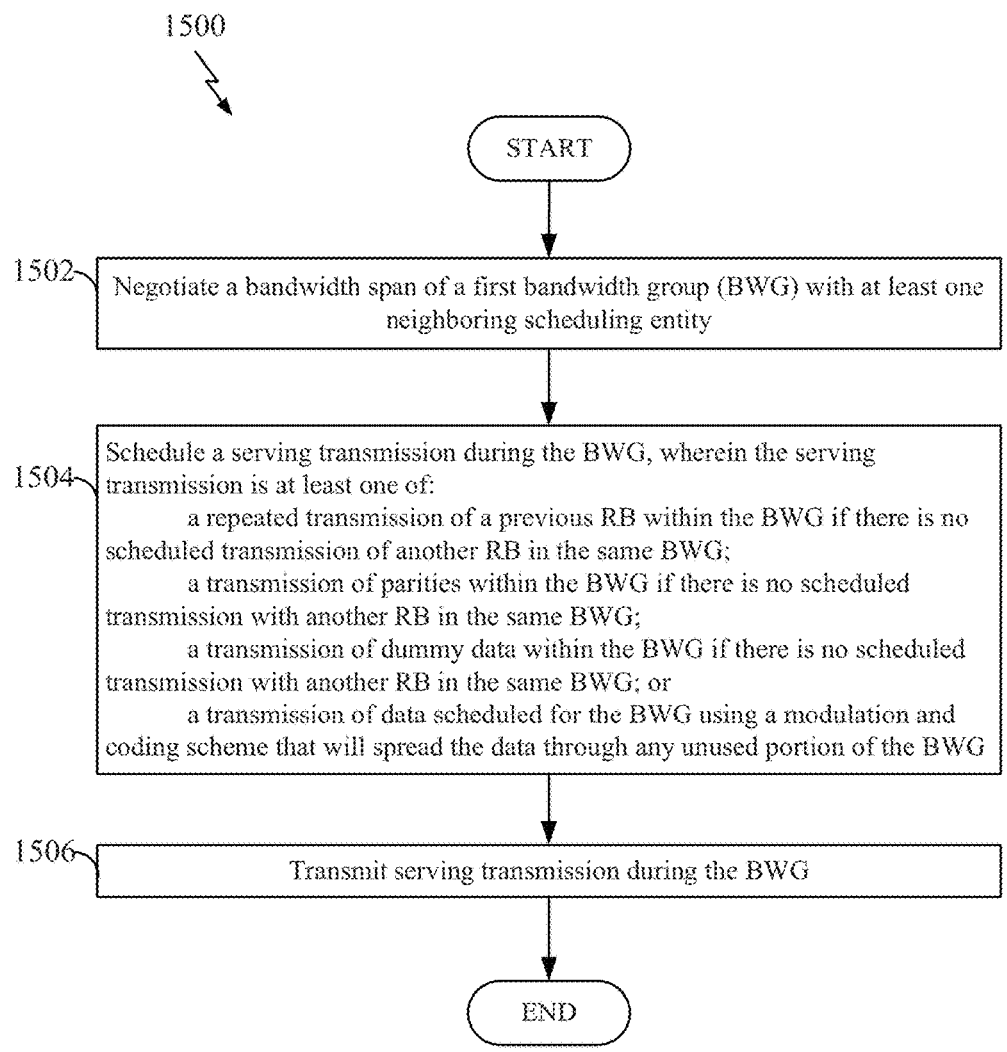
FIG. 15 is a flow chart illustrating an exemplary process for wireless communication in accordance with some aspects of the disclosure.

FIG. 15 is a flow chart illustrating an exemplary process 1500 for wireless communication in accordance with some aspects of the disclosure. As described below, some or all illustrated features might be omitted in a particular implementation within the scope of the present disclosure, and some illustrated features might not be required for implementation of all aspects. In some examples, the process 1500 might be carried out by the scheduling entity 1100 illustrated in FIG. 11. In some examples, the process 1500 might be carried out by any suitable apparatus or means for carrying out the processes, functions, or algorithm described below.

At block 1502, a scheduling entity might negotiate a bandwidth span of a first bandwidth group (BWG) with at least one neighboring scheduling entity.

At block 1504, the scheduling entity might schedule a serving transmission during the BWG, wherein the serving transmission is at least one of:

a repeated transmission of a previous RB within the BWG if there is no scheduled transmission of another RB in the same BWG;

a transmission of parities within the BWG if there is no scheduled transmission with another RB in the same BWG;

a transmission of dummy data within the BWG if there is no scheduled transmission with another RB in the same BWG; or a transmission of data scheduled for the BWG using a modulation and coding scheme that will spread the data through any unused portion of the BWG.

At block 1504, the scheduling entity might transmit the serving transmission during the BWG.

In some aspects of the method, the transmission parameter is at least one of a precoder, rank, modulation order, power inside each bandwidth group, and/or numerology.

In some aspects of the method, the numerology is scalable.

In some aspects of the method, the numerology is a combination of subcarrier spacing and cyclic prefix (CP) overhead, and the subcarrier spacing might be scaled while keeping constant the CP overhead as a percentage of a symbol duration.

Figure 16:
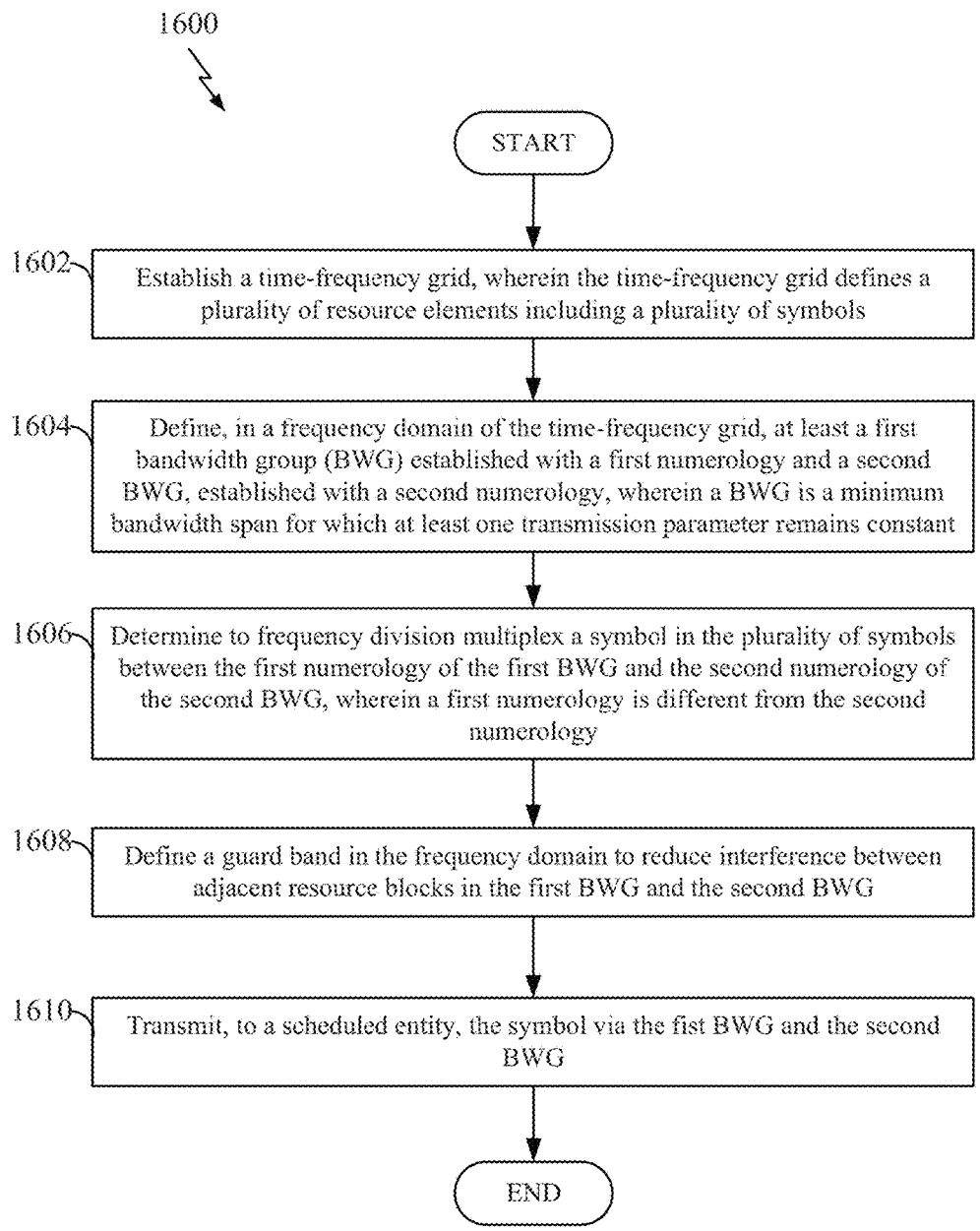
FIG. 16 is a flow chart illustrating an exemplary process for wireless communication in accordance with some aspects of the disclosure.

FIG. 16 is a flow chart illustrating an exemplary process 1600 for wireless communication in accordance with some aspects of the disclosure. As described below, some or all illustrated features might be omitted in a particular implementation within the scope of the present disclosure, and some illustrated features might not be required for implementation of all aspects. In some examples, the process 1600 might be carried out by the scheduling entity 1100 illustrated in FIG. 11. In some examples, the process 1600 might be carried out by any suitable apparatus or means for carrying out the processes, functions, or algorithm described below.

At block 1602, a scheduling entity might establish a time-frequency grid, wherein the time-frequency grid defines a plurality of resource elements including a plurality of symbols.

At block 1604, the scheduling entity might define, in a frequency domain of the time-frequency grid, at least a first bandwidth group (BWG) established with a first numerology and a second BWG, established with a second numerology, wherein a BWG is a minimum bandwidth span for which at least one transmission parameter remains constant.

At block 1606, the scheduling entity might determine to frequency division multiplex a symbol in the plurality of symbols between the first numerology of the first BWG and the second numerology of the second BWG, wherein a first numerology is different from the second numerology.

At block 1608, the scheduling entity might define a guard band in the frequency domain to reduce interference between adjacent resource blocks in the first BWG and the second BWG.

At block 1610, the scheduling entity might transmit, to a scheduled entity, the symbol via the first BWG and the second BWG.

In some aspects of the method, the transmission parameter is at least one of a precoder, rank, modulation order, power inside each bandwidth group, and/or numerology.

In some aspects of the method, the numerology is scalable.

In some aspects of the method, the numerology is a combination of subcarrier spacing and cyclic prefix (CP) overhead, and the subcarrier spacing might be scaled while keeping constant the CP overhead as a percentage of a symbol duration.

In some aspects, the method might further comprise redefining the time-frequency grid in the frequency domain by inserting the guard band between the first BWG and the second BWG.

In some aspects, the method might further comprise defining the second BWG as the guard band.

In some aspects, the first BWG comprises a first plurality of resource blocks and the second BWG comprises a second plurality of resource blocks, and the method further comprises defining a first of two resource blocks on a boundary between the first BWG and the second BWG to be the guard band.

In some aspects, the first of the two resource blocks is smaller than a second of the two resource blocks.

In some aspects, the spacing between subcarriers in a symbol is different between a first set of resource elements in a first resource block and a second set of resource elements in a second resource block.

In one configuration, the scheduling entity 1100 and/or scheduled entity 1200 for wireless communication (i.e., the apparatus for wireless communication) includes means for determining that interference is present from a neighboring scheduling entity that implements a second subcarrier spacing that is different from a first subcarrier spacing of the scheduling entity, means for requesting the neighboring scheduling entity to negotiate a bandwidth group (BWG), wherein the BWG is a bandwidth occupied by downlink subcarriers within which a transmission parameter is maintained, means for negotiating the bandwidth; and means for transmitting, if negotiating is successful, downlink data to a scheduled entity served by the scheduling entity according to the bandwidth. In one configuration, the scheduling entity 1100 and/or scheduled entity 1200 for wireless communication includes means for establishing a time-frequency grid, wherein the time-frequency grid defines a plurality of resource elements including a plurality of symbols, means for defining, in a frequency domain of the time-frequency grid, at least a first bandwidth group (BWG) established with a first numerology and a second BWG, established with a second numerology, wherein a BWG is a minimum bandwidth span for which at least one transmission parameter remains constant, means for determining to frequency division multiplex a symbol in the plurality of symbols between the first numerology of the first BWG and the second numerology of the second BWG, wherein a first numerology is different from the second numerology, and means for defining a guard band in the frequency domain to reduce interference between adjacent resource blocks in the first BWG and the second BWG. In one aspect, the aforementioned means might be the processor(s) 1104, 1204 in which the above-described methodology resides from FIGS. 11 and/or 12 configured to perform the functions recited by the aforementioned means. In another aspect, the aforementioned means might be a circuit or any apparatus configured to perform the functions recited by the aforementioned means.

Of course, in the above examples, the circuitry included in the processor 1104, 1204 is merely provided as an example, and other means for carrying out the described functions might be included within various aspects of the present disclosure, including but not limited to the instructions stored in the computer-readable medium 1106, 1206, or any other suitable apparatus or means described in any one of the FIGS. 1-12, and utilizing, for example, the processes, functions, or algorithms described herein in relation to FIGS. 13-16.

Several aspects of a wireless communication network have been presented with reference to an exemplary implementation. As those skilled in the art will readily appreciate, various aspects described throughout this disclosure might be extended to other telecommunication systems, network architectures and communication standards.

By way of example, various aspects might be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects might also be extended to systems defined by the 3rd Generation Partnership Project 2 (3GPP2), such as CDMA2000 and/or Evolution-Data Optimized (EV-DO). Other examples might be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C might still be considered coupled to one another—even if they do not directly physically touch each other. For instance, a first object might be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-16 might be rearranged and/or combined into a single component, step, feature or function or embodied in several components, steps, or functions. Additional elements, components, steps, and/or functions might also be added without departing from novel features disclosed herein. The apparatus, devices, and/or components illustrated in FIGS. 1-16 might be configured to perform one or more of the methods, features, or steps described herein. The novel algorithms described herein might also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods might be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein might be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, operational at a scheduling entity, comprising:
   determining, at the scheduling entity, that interference is present from a neighboring scheduling entity that implements a second subcarrier spacing that is different from a first subcarrier spacing of the scheduling entity;
   requesting the neighboring scheduling entity to negotiate a bandwidth group (BWG), wherein the BWG is a bandwidth occupied by downlink subcarriers within which a transmission parameter is maintained;
   negotiating a bandwidth of the bandwidth group to establish an agreement, on the bandwidth, between the scheduling entity and the neighboring scheduling entity;
   determining whether the agreement occurred; and
   in response to a determination that the agreement has occurred, transmitting downlink data to a scheduled entity served by the scheduling entity according to the bandwidth group.

2. The method of claim 1, wherein the transmission parameter includes at least one of a precoder, rank, modulation order, power inside each bandwidth group, or numerology.

3. The method of claim 1, wherein the transmission parameter comprises a numerology that is scalable.

4. The method of claim 2, wherein the numerology is a combination of subcarrier spacing, symbol duration, and cyclic prefix (CP) overhead, and the subcarrier spacing and symbol duration are scaled while keeping constant the CP overhead as a percentage of the symbol duration.

5. The method of claim 1, wherein the BWG is a common multiple of a bandwidth of resource blocks of the scheduling entity and resource blocks of the neighboring scheduling entity.

6. The method of claim 1, wherein the BWG has a bandwidth at least as wide as a widest bandwidth resource block between the scheduling entity and the neighboring scheduling entity.

7. The method of claim 1, further comprising:
   negotiating the bandwidth of the BWG by exchanging at least one of a desired BWG, subcarrier spacing (SCS), number of resource blocks (RBs)-per-group, or number of subcarriers-per-RB,
   wherein the desired BWG is equal to SCS*(number of RBs-per-group)*(number of subcarriers-per-RB).

8. The method of claim 1, further comprising:
   in response to a determination that the agreement has not occurred, transmitting a notification that a first portion of a resource block (RB) will have a constant interference and a remainder of the RB will have a non-constant interference to the scheduled entity.

9. A scheduling entity apparatus for wireless communication, comprising:
   a processor;
   a transceiver communicatively coupled to the processor; and
   a memory communicatively coupled to the processor,
   wherein the processor is configured to:
   determine, at the scheduling entity, that interference is present from a neighboring scheduling entity that implements a second subcarrier spacing that is different from a first subcarrier spacing of the scheduling entity;
   request the neighboring scheduling entity to negotiate a bandwidth group (BWG), wherein the BWG is a bandwidth occupied by downlink subcarriers within which a transmission parameter is maintained;
   negotiate the bandwidth of the bandwidth group to establish an agreement, on the bandwidth, between the scheduling entity and the neighboring scheduling entity;
   determining whether the agreement occurred; and
   in response to a determination that the agreement has occurred, transmit downlink data to a scheduled entity served by the scheduling entity according to the bandwidth group.

10. The apparatus of claim 9, wherein the transmission parameter includes at least one of a precoder, rank, modulation order, power inside each bandwidth group, or numerology.

11. The apparatus of claim 9, wherein the transmission parameter comprises a numerology that is scalable.

12. The apparatus of claim 9, wherein the processor is further configured to:
   negotiate the bandwidth of the bandwidth group by exchanging at least one of a desired BWG, subcarrier spacing (SCS), number of resource blocks (RBs)-per-group, or number of subcarriers-per-RB,
   wherein the desired BWG is equal to SCS*(number of RBs-per-group)*(number of subcarriers-per-RB).

13. The apparatus of claim 9, wherein the processor is further configured to:
   in response to a determination that the agreement has not occurred, transmit a notification that a first portion of a resource block (RB) will have a constant interference and a remainder of the RB will have a non-constant interference to the scheduled entity.

14. A method of wireless communication, operational at a scheduling entity, comprising:
   establishing a time-frequency grid, wherein the time-frequency grid defines a plurality of resource elements including a plurality of symbols;
   defining, in a frequency domain of the time-frequency grid, at least a first bandwidth group (BWG) established with a first numerology and a second BWG, established with a second numerology, wherein a BWG is a minimum bandwidth span for which at least one transmission parameter remains constant in all resource blocks inside the minimum bandwidth span;
   determining to frequency division multiplex a symbol in the plurality of symbols between the first numerology of the first BWG and the second numerology of the second BWG, wherein the first numerology is different from the second numerology;
   defining a guard band in the frequency domain to reduce interference between adjacent resource blocks in the first BWG and the second BWG; and
   transmitting, to a scheduled entity, the symbol via the first BWG and the second BWG.

15. The method of claim 14, wherein the transmission parameter includes at least one of a precoder, rank, modulation order, power inside each bandwidth group, or numerology.

16. The method of claim 15, wherein the numerology is a combination of subcarrier spacing, symbol duration, and cyclic prefix (CP) overhead, and the subcarrier spacing and symbol duration are scaled while keeping constant the CP overhead as a percentage of the symbol duration.

17. The method of claim 14, further comprising:
redefining the time-frequency grid in the frequency domain by inserting the guard band between the first BWG and the second BWG.

18. The method of claim 14, further comprising:
defining the second BWG as the guard band.

19. The method of claim 14, wherein the first BWG comprises a first plurality of resource blocks and the second BWG comprises a second plurality of resource blocks, the method further comprising:
defining a first resource block, of two adjacent resource blocks, on a boundary between the first BWG and the second BWG as the guard band.

20. The method of claim 19, wherein the first resource block is a smaller resource block of the two adjacent resource blocks.

21. The method of claim 14, further comprising negotiating, by the scheduling entity with a neighboring scheduling entity, the at least first BWG and second BWG, and the defining of the at least first BWG and second BWG is based on a result of the negotiating.

22. The method of claim 14, wherein the transmission parameter comprises a numerology that is scalable.

23. An apparatus for wireless communication, comprising:
a processor;
a transceiver communicatively coupled to the processor; and
a memory communicatively coupled to the processor, wherein the processor is configured to:
establish a time-frequency grid, wherein the time-frequency grid defines a plurality of resource elements including a plurality of symbols;
define, in a frequency domain of the time-frequency grid, at least a first bandwidth group (BWG) established with a first numerology and a second BWG, established with a second numerology, wherein a BWG is a minimum bandwidth span for which at least one transmission parameter remains constant in all resource blocks inside the minimum bandwidth span;
determine to frequency division multiplex a symbol in the plurality of symbols between the first numerology of the first BWG and the second numerology of the second BWG, wherein the first numerology is different from the second numerology;
define a guard band in the frequency domain to reduce interference between adjacent resource blocks in the first BWG and the second BWG; and
transmit, to a scheduled entity, the symbol via the first BWG and the second BWG.

24. The apparatus of claim 23, wherein the transmission parameter includes at least one of a precoder, rank, modulation order, power inside each bandwidth group, or numerology.

25. The apparatus of claim 24, wherein the numerology is a combination of subcarrier spacing and cyclic prefix (CP) overhead, and the subcarrier spacing is scaled while keeping constant the CP overhead as a percentage of a symbol duration.

26. The apparatus of claim 23, wherein the processor is further configured to:
redefine the time-frequency grid in the frequency domain by inserting the guard band between the first BWG and the second BWG.

27. The apparatus of claim 23, wherein in the processor is further configured to:
define the second BWG as the guard band.

28. The apparatus of claim 23, wherein the first BWG comprises a first plurality of resource blocks and the second BWG comprises a second plurality of resource blocks, and wherein the processor is further configured to:
define a first resource block, of two adjacent resource blocks, on a boundary between the first BWG and the second BWG as the guard band.

29. The apparatus of claim 28, wherein the first resource block is a smaller resource block of the two adjacent resource blocks.

30. The apparatus of claim 23, wherein the transmission parameter comprises a numerology that is scalable.

* * * * *